United States Patent [19]

Gold

[11] E Patent Number: Re. 31,971

[45] Reissued Date of Patent: Aug. 20, 1985

[54] WHEEL UNBALANCE MEASUREMENT SYSTEM AND METHOD

[75] Inventor: Kenneth S. Gold, Canoga Park, Calif.

[73] Assignee: FMC Corporation, Chicago, Ill.

[21] Appl. No.: 464,094

[22] Filed: Jan. 26, 1983

Related U.S. Patent Documents

Reissue of:

[64] Patent No.: 4,285,240
Issued: Aug. 25, 1981
Appl. No.: 111,159
Filed: Jan. 11, 1980

[51] Int. Cl.[3] ..... G01M 1/22

[52] U.S. Cl. ..... 73/462; 73/1 B

[58] Field of Search ..... 73/1 B, 462–466; 364/463, 576

[56] References Cited

U.S. PATENT DOCUMENTS

| | | | |
|---|---|---|---|
| 2,243,379 | 5/1941 | Johnson | 73/462 X |
| 2,331,733 | 10/1943 | Senger | 73/463 X |
| 3,205,713 | 9/1965 | Thomas et al. | 73/462 |
| 3,380,286 | 4/1968 | Porter | 73/1 B |
| 3,527,103 | 9/1970 | Hale et al. | 73/462 |
| 3,680,390 | 8/1972 | Bjorn | 73/457 |
| 3,751,987 | 8/1973 | Whitmore | 73/465 |
| 4,015,480 | 4/1977 | Giers | 73/462 |
| 4,018,087 | 4/1977 | Wenz | 73/462 |
| 4,046,017 | 9/1977 | Hill | 73/462 |
| 4,109,312 | 8/1978 | Beutel | 73/462 X |
| 4,169,383 | 10/1979 | Guyot et al. | 73/462 |
| 4,173,146 | 11/1979 | Kogler et al. | 73/462 |

*Primary Examiner*—James J. Gill
*Attorney, Agent, or Firm*—H. M. Stanley; R. B. Megley

[57] ABSTRACT

An off-the-car wheel unbalance measuring system has a rotationally driven wheel mounting shaft supported in a pedestal together with a pair of force transducers mounted in the pedestal adjacent to and spaced along the shaft. The force transducers are coupled mechanically to the shaft and provide periodic electrical output signals indicative of unbalance forces transmitted through the shaft when the shaft is driven rotationally. The angular position of the shaft is monitored with respect to an angular reference position at a predetermined number of angular increments during each full revolution of the shaft. The transducer output signals are converted in electrical circuitry within the system to digital form, and a multiplication operation is performed on the digitized signals at each angular increment using sine and cosine representative factors corresponding to that particular angular increment. The sine and cosine factors are stored in memory and are called up from storage in accordance with the monitored angular position of the shaft. The system circuitry operates to sum the digitized signals including sine and cosine factors thereby providing operating data from which unbalance force magnitude and angular position is calculated. Operation of the system while a known unbalance is mounted on the shaft and also while the shaft is running free provides data from which calibration constants for the system are calculated and thereafter applied to the operating data to correct unbalance measurements for shaft unbalance and transducer idiosyncrasies.

45 Claims, 19 Drawing Figures

FIG_13
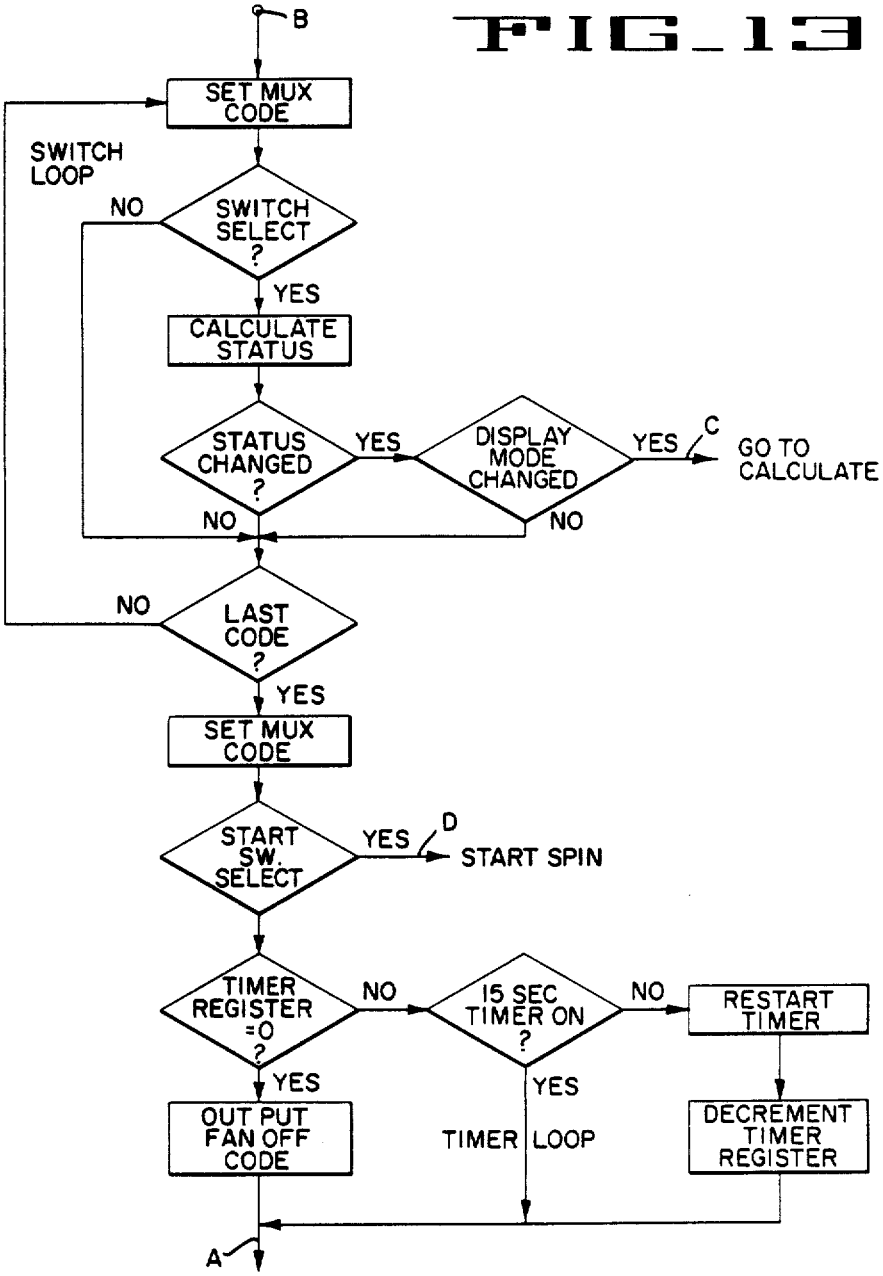
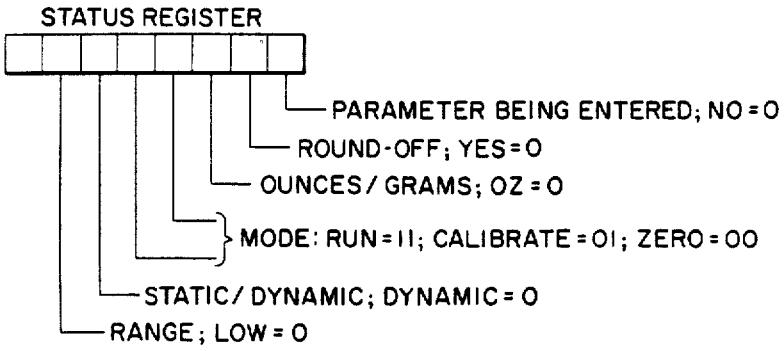
FIG_14

WHEEL UNBALANCE MEASUREMENT SYSTEM AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a system for measuring and displaying unbalance in a rotating body and more particularly to such a system which has the capability of measuring and compensating for system imposed unbalance measurement errors.

2. Description of the Prior Art

Vibration vector measurement for determining unbalance in a rotating body is well known. For example, U.S. Pat. No. 3,220,247, issued to Goodman, discloses apparatus for obtaining such measurements which includes an unbalance pickup device which provides signals indicative of the unbalance or vibration vector in the rotating body. Sine and cosine generators are also provided which generate reference signals with reference periods which are the same as the periods of the unbalance signals. The unbalance signals and the reference signals are coupled to multipliers and the resulting products are passed through filtering circuits to obtain average or mean values. An analog circuit implementing Fourier analysis to process the unbalance signals in analog form and to thereby obtain the unbalance vector magnitude and direction is also disclosed in the Goodman patent.

In U.S. Pat. No. 3,751,987, issued to Whitmore, a dynamic balancing machine is disclosed which includes an electronic circuit coupled to transducers which sense the unbalance and provide unbalance signals. A reference detector is also provided to indicate a zero angle reference for the rotating portion of the balancing machine. Sine and cosine signals are produced relative to the reference signal, and an analog multipler circuit multiples the unbalance signal with the sine and cosine reference signals thereby providing product outputs which are subsequently filtered. The filtered product outputs represent means values which are displayed as indicators of the magnitude and angular location of the unbalance force. This method of extracting the sine and cosine coefficients from an unknown periodic unbalance force to obtain the magnitude and direction of the unbalance force has long been in use. U.S. Pat. No. 4,015,480, issued to Giers, discloses such a system wherein a portion of the signal processing is done in digital fashion. Reference sine and cosine values having an oscillation frequency which is the same as that of the unbalance vibration are digitized together with the unbalance signals and are thereafter multiplied to provide sine products and cosine products. The sine and cosine products are summed, means values are extracted from the two sums, and the mean values are utilized to identify the magnitude and phase of the unbalance.

U.S. Pat. No. 4,046,017, issued to Hill, discloses a dynamic wheel balancing apparatus having a rotating shaft on which the body to be balanced is mounted together with a pair of force transducers adjacent to the shaft which provide signals representative of the unbalance in the body. The apparatus further includes circuitry which provides pulses corresponding to rotational increments of the shaft. A counter is provided which counts the pulses starting from the time when the unbalance force produced by the rotating body passes through a particular angular position such as the vertically upward position. The shaft is spun, the counter is actuated to count pulses, the counter output is converted to an analog signal, the analog signal is stored, and the shaft is stopped. The wheel is thereafter rotated by hand until an angular position meter indicates the shaft is in the angular position at which the unbalance in the body was measured. At initial installation the rotating shaft on which the unbalanced wheel is to be mounted is mechanically balanced to eliminate error insertion. A subsequent replacement of the spin shaft requires mechanical rebalancing of the machine. Mechanical and electrical adjustments sometimes being interactive, a trained person is usually required to set them in the machine.

It is desirable to provide an unbalance force measuring machine and method which may be calibrated by the machine operator and which provides highly accurate unbalance vector readings which are substantially unaffected by mechanical and electrical component drift.

SUMMARY OF THE INVENTION

The present invention provides an apparatus and method for measuring the unbalance of a rotating boby and for resolving the unbaance in either one or two planes which are normal to the axis of rotation of the body. A force transducer is mechanically coupled to a rotating shaft on which the rotatably body is mounted and provides an electrical signal which is indicative of the periodic force at the transducer generated by the unbalance mass in the body during rotation. An analog-in-digital converter receives the electrical signal from the transducer and provides a digital word output which corresponds to the instantaneous magnitude of the periodic force. Means is provided for controlling the analog-to-digital converter so that the digital words are provided at a predetermined number of angular increments during each revolution of the rotation shaft. A memory is provided which contains a plurality of stored digital sine and cosine representative quantities, each of which correspond to one or more of the predetermined angular increments. During the time that the rotating shaft is traversing each of the angular increments the means for controlling operates on each of the digital words in accordance with the corresponding sine and cosine representative quantities to provide modified quantities having sine factors and modified quantities having cosine factors. The quantities including sine and cosine factors are obtained within an execution time which is minimized by appropriate selection of the stored digital sine and cosine representative quantities. Means is provided for summing the modified quantities containing the sine and the cosine factors obtained for each one of the angular increments so that data is provided for determining the unbalance mass magnitude and its angular location on the body.

The method of determining the unbalance in a rotatable body with an unknown unbalance weight and for calibrating the apparatus involves spinning the shaft with no load thereon and obtaining a no load unbalance signal and then computing no load unbalance signal numerical quantities representative of the phase and magnitude of the unbalance. Then the process is repeated with a known calibration weight at a known angular position being mounted on the shaft to obtain calibration signal numerical quantities representative of the magnitude and phase of unbalance. The no load unbalance signal numerical quantities are then subtracted from the calibration unbalance signal numerical quantities from which calibration constants are computed. Finally, the shaft is spun with an unknown unbalance weight thereon to provide unbalance signal numerical quantities representative of the phase and magnitude of the unknown unbalance. These latter numerical quantities are first corrected by subtracting the no load numerical quantities therefrom, and then the calibration constants are applied to obtain the correct data for the phase and magnitude of the unknown unbalance.

BRIEF DESCRIPTION OF THE DRAWINGS

FIGS. 11, 12 and 13 are program flow diagrams for the control scan and storage subroutines indicated in the program of FIG. 10.

FIG. 14 is a diagram illustrating the content of the status register which relates to the subroutine of FIG. 13.

DESCRIPTION OF THE PREFERRED EMBODIMENTS

Figure 1:
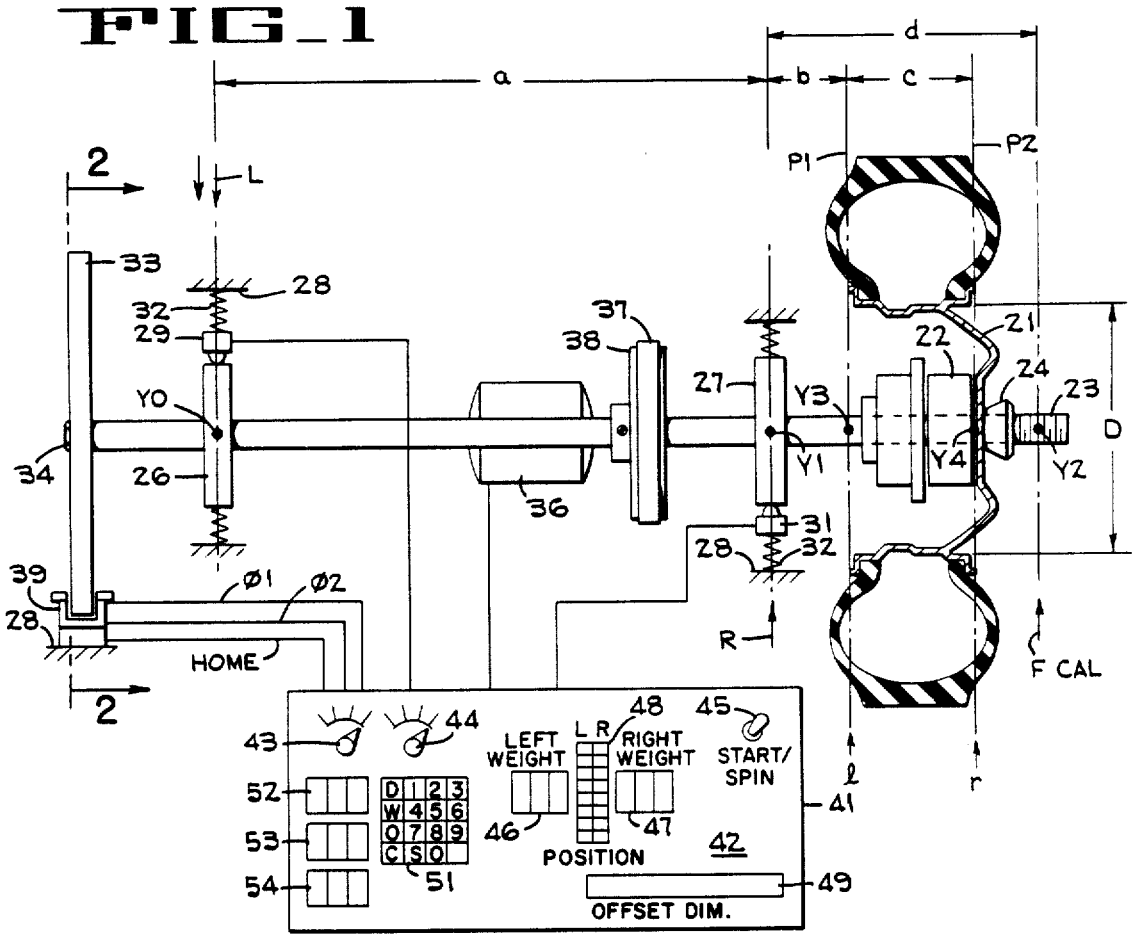
FIG. 1 is a diagrammatic plan view of the unbalance measurement system of the present invention.

In FIG. 1 of the drawings of conventional mechanical arrangement is shown for measurement of an unbalance mass in a rotating body, the unbalance mass produces an unbalance force when the body is spun. As depicted therein an automobile rim and tire combination 21 is shown as the rotating body securely mounted against a shoulder member 22 which is attached to the end of a rotating shaft 23. The rim portion of the rim and tire combination has the usual centrally disposed hole which fits over the end of the shaft 23. The rim is held tightly in place by a wheel clamp 24 which engage threads formed on the end of the shaft 23. A pair of bearing housings 26 and 27 are resiliently supported within a fixed, rigid framework 28. The shaft 23 is supported on inner bearing members within the bearing housings 26 and 27, thereby being disposed for rotational motion within the framework 28. Left and right force transducers 29 and 31, respectively, are positioned between the framework 28 and the bearing housings 26 and 27. A resilient spring 32 is positioned between each of the force transducers and the framework to maintain the force transducers 29 and 31 in continuous contact with the bearing housings 26 and 27.

An encoder disc 33 is secured to the end of the shaft 23 opposite the end carrying the rim and tire combination 21 by means of a nut 34 and therefore rotates with the shaft. A motor 36 is mounted on the framework 28 functioning to drive the shaft 23 rotationally through a belt 37 and a pulley 38 which is fixedly mounted on the shaft 23.

A photosensor and light source assembly 39 is mounted on the framework 28 adjacent to the edge of the encoder disc 33. Signals provided by the photosensor and light source assembly 39 are connected to circuitry contained within a console 41 having a front panel 42 thereon. The signals provided by the photosensor and light source assembly are three in number, said signals being labeled in FIG. 1 as $\phi 1$, $\phi 2$ and "home", or reference. Force transducers 29 and 31 are also connected to the electronic circuitry contained in console 41 as is the motor 36. The mechanical arrangement of the wheel unbalance measuring device as disclosed herein to this point may be of the type described in U.S. Pat. No. 4,046,017 issued to Hill.

Switches and displays for setting and monitoring the unbalance measurement are shown on the front panel 42. A start/spin switch 45 is seen in FIG. 1 which initiates a shaft spin routine. A multiposition machine mode switch 43 and a multiposition display mode switch 44 are positioned on the front panel 42. The machine mode switch 43 may be set to select a run mode, a calibrate mode or a zero shaft unbalance mode. The display mode switch 44 may be set to select a display of ounces, ounces rounded off, grams or grams rounded off. The displayed units as selected appear in three place left and right unbalance weight indication windows 46 and 47. Left and right position indicators 48 provide angular information indicative of where weights should be attached at the rim of the rim and tire combination 21 to counterbalance the measured unbalance mass. A conventional offset dimension measurement gauge 49 is provided on the front panel 42 from which a convenient reading of the axial position of the rim and tire assembly 21 on the shaft 23 be obtained. Rim and tire assembly physical parameters are entered into the system by means of a four-by-four keyboard 51. The offset dimension is entered by selecting the "O" in the first column, third row on the keyboard and the appropriate offset measurement by means of the numbered keys. The offset is represented in FIG. 1 by the letter "b". In like manner the diameter D of the rim in the wheel assembly 21 is entered into the system by selecting the key shown as "D" and the appropriate diameter dimension on the numbered keys. The width of the wheel assembly 21 is taken between the two planes, seen as P1 and P2 in FIG. 1, at which counterbalancing weights may be applied to the rims of the wheel assembly. Wheel width is represented in the diagram by the letter "c". The width is entered into the system by selecting the key marked "W" on the keyboard 51 together with the appropriate numbered keys. The selected diameter, width and offset values are displayed in the three place displays 52, 53 and 54, respectively. A calculate function and alternate static/dynamic function, both to be hereinafter described more fully, may also be selected at keys C and S on the keyboard 51.

As stated hereinbefore, the force measuring mechanism is similar to that which has been utilized previously inasmuch as forces are sensed by two force transducers which measure allof the forces required to maintain the rotating shaft within the horizontal plane as depicted in the view of FIG. 1. The encoder disc 33 and the photosensor and light source assembly 39 perform as an optical shaft encoder for the wheel balancing shaft 23. A "home" position is measured for the shaft rotation and occurs once for each rotation of the shaft. The "home" position provides an angular reference and rotationally locates a number of calibration constants with respect to the angular position of the shaft. The calibration constants are used to reduce errors introduced into the measurement of unbalance in the rotating body. The unbalance forces are measured when the shaft is spun while loaded with a known calibrating weight and are also mounted when the shaft 23 is spun unloaded. Calculations are performed involving the transducer calibration and zero unbalance data, and the results are stored for later use in the solution of unbalance force equations when an unbalanced body is mounted on the shaft and rotated.

The unbalance force equations deal with the unbalance vectors and associated constants which are presumed to be free of any electrical or mechanical noninformation bearing noise signals. The unbalance vectors therefore represent only the sinusoidally varying components of the actual rotating body unbalance, or the calibration weight unbalance, or the unloaded shaft unbalance as the shaft rotates. The freedom from noise presumption is justified by the following considerations. The unbalance force signals from the transducers are digitized and sampled, as will hereinafter be described, at discrrete angular increments of shaft rotation as determined by the pattern of apertures 79 in the disc 33. The sampling of data and summing of the sampled data rejects nonharmonic noise having frequencies with periods shorter than the total sampling time as is well known by those of skill in this art. Harmonic noise is rejected by the operations which produce combined quantities containing sine and cosine factors and the subsequent summation. The process performed by the apparatus includes the extraction of the FOurier series coefficients for the fundamental sine and cosine components in the processed data outputs. The processed data is obtained by operating on the force transducer output signals with numbers representative of the sine and the cosine of the shaft angle at the instant the output exists to obtain quantities containing sine factors and quantities containing cosine factors, and by subsequently undertaking independent summations (integrations) of the sine factor quantities and of the cosine factor quantities. The processing is carried out digitally by digitizing the transducer outputs and the quantities representative of the sine and the cosine of the shaft angular position and by performing the operation on the digitized transducer outputs at predetermined angular positions of the shaft. The sine and cosine representative quantities are selected so that they tend to reduce the contribution of harmonics to the processed data. Consequently, the processed data in the form of the sine and cosine summations is relatively free of harmonic content. With the knowledge that the fundamental sine and cosine coefficients for each force transducer output can be recovered substantially noise free and measured, the mass unbalance measurement equations for a rotating body may be developed.

The force which acts on either one of the force tranducers 29 and 31 of FIG. 1 may be expressed as a rotating vector which is determined by the rotating voltage vector from the transducer multiplied by a fixed transducing constant vector. The following relationship results:

$$\vec{F}=\vec{K}\cdot\vec{E}; \tag{1}$$

where $\vec{F}$ is the force vector, $\vec{K}$ is the calibration constat vector, and $\vec{E}$ is the voltage vector from the transducer. If the angle between the voltage vector and the force vector was the same in all installed transducers then the calibration constant vector would always have the same phase angle. However, location of the force transducers within the machine, variations in rotating shafts and the sensitivity constants of the force transducers in output per unit of force will vary from unit to unit. Therefore the general form of equation (1) herein becomes:

$$F<\gamma=K<\beta\cdot E<\theta \tag{2}$$

where F, $\gamma$ are magnitude and phase of the force vector; K,$\beta$ are magnitude and phase of the calibration constant vector; and E, $\theta$ are magnitude and phase of the voltage vector.

If a known or calibrating weight is attached at a defined mechanical position on the rotating shaft, a resulting force vector will appear when the shaft is spun. By measuring the transducer voltage vector, the vector quantity representing the transducer calibration constant may be established. This is shown in the following:

If $\gamma=0$ (occurs when the calibrating weight is placed at a predetermined reference position) then manipulation of equation (2) provides $$K\angle\beta = \frac{Fc}{Ec}\angle\theta c$$

(in polar notation). The indication is that $\beta$ and $\theta C$ are the same angle, whereby $$K\cos\theta c + jK\sin\theta c = \frac{Fc}{Ec\cos\theta c - jEc\sin\theta c}$$

(in rectangular coordinate notation), where the script letter c denotes calibration values.

Now letting:

$$Kcx = K\cos\theta c$$
$$Kcy = K\sin\theta c$$
$$Ecx = Ec\cos\theta c$$
$$Ecy = Ec\sin\theta c$$

and by multiplying the numerator and denominator on the right side of the immediately preceding relationship by $$Ecx + jEcy; \tag{3}$$

$$Kcx + jKcy = \frac{Fc\,Ecx + jFc\,Ecy}{(Ecx)^2 + (Ecy)^2};$$

-continued and $$Kcx = \frac{Fc\ Ecx}{(Ecx)^2 + (Ecy)^2} \text{ and } Kcy = \frac{Fc\ Ecy}{(Ecx)^2 + (Ecy)^2}$$

By analogy to equation (2) recited herinbefore the following general relationship may be stated:

$$F \cos \gamma + jF \sin \gamma = (K \cos \theta c + jK \sin \theta c)(E \cos \theta + E \sin \theta)$$

The operation indicated in equation (4) results in the following general force equations:

$$\begin{cases} Fx = KcxEx - KcyEy \\ Fy = KcyEx + EcxEy; \end{cases} \quad (5)$$

where $Fx = F\cos\gamma$; $Fy = F\sin\gamma$; $Ex = E\cos\theta$ and $Ey = E\sin\theta$ Referring again to FIG. 1 of the drawings the derivation of the actual calibrating constants for the left and right transducers 29 and 31 will be described. A calibrating weight of known magnitude is attached to the shaft 23 at a known angular position at a point indicated as Y2 thereon. When the rotating shaft 23 is spun about the shaft axis a reaction force L is applied at the point Y0 on the shaft and a reaction force R is applied at a point Y1 on the shaft to counteract the force due to the mass unbalance imposed by the calibrating weight and to maintain the shaft in static equilibrium. The force imposed at the point Y2 on the shaft 23 by the calibrating weight is termed Fcal. Therefore, the static requirements of the mechanical arrangement of FIG. 1 during calibration are:

$$\vec{Lc} + \vec{Rc} + \vec{Fcal} = 0;$$

which is the vector sum where Lc and Rc are forces at left and right transducers with Fcal applied. Taking moments about the point Y1;

$$\overrightarrow{a(Lc)} = \overrightarrow{(Fcal)}\, d; \text{ and} \quad (6)$$

$$\overrightarrow{Lc_1} = \overrightarrow{Fcal}\,\frac{d}{a}$$

$$\overrightarrow{Rc} = \overrightarrow{-Fcal} - \overrightarrow{Lc} = \overrightarrow{-Fcal}\left(1 + \frac{d}{a}\right)$$

Letting the following symbols be substituted as indicated, subsequent relationships may be simplified:

Left transducer: $Fc = Fcal\,\frac{d}{a}$; $Ecx = Elxc$;

$Ecy = Elyc$; $Kcx = Klx$; $Kcy = Kly$

Right transducer: $Fc = Fcal\left(1 + \frac{d}{a}\right)$;

$Ecx = Erxc$; $Ecy = Eryc$; $Kcx = Krx$; $Kcy = Kry$

Now returning to equations (3) hereinbefore the following calibration constants for the left and right transducers 29 and 31 result:

$$\begin{cases} Klx = \dfrac{Fcal\,(d/a)\,Elxc}{(Elxc)^2 + (Elyc)^2} \text{ (left, x direction)} \\ Kly = \dfrac{Fcal\,(d/a)\,Elyc}{(Elxc)^2 + (Elyc)^2} \text{ (left, y direction)} \\ Krx = \dfrac{-Fcal\,(1 + d/a)\,Erxc}{(Erxc)^2 + (Eryc)^2} \text{ (right, x direction)} \\ Kry = \dfrac{-Fcal\,(1 + d/a)\,Eryc}{(Erxc)^2 + (Eryc)^2} \text{ (right, y direction)} \end{cases} \quad (8)$$

If the foregoing calibration constants of relationships (8) are applied to the general force transducer equations of relationships (5) and if Ex equals Elx and Ey equals Ely, then for the left transducer the following x and y force components at the normal plane through Y0 are calculated:

$$\begin{aligned} Flx &= (Klx)(Elx) - (Kly)(Ely) \\ Fly &= (Kly)(Elx) + (Klx)(Ely) \end{aligned} \quad (9)$$

In like manner if Ex equals Erx and Ey equals Ery then for the right transducer the x and y force components in the plane normal to the shaft at point Y1 are calculated as:

$$\begin{aligned} Frx &= (Krx)(Erx) - (Kry)(Ery) \\ Fry &= (Kry)(Erx) + (Krx)(Ery) \end{aligned} \quad (10)$$

With relationships (9) and (10) as set forth herein a solution may be reached for any generalized set of forces applied to the shaft 23.

Referring again to FIG. 1, it may be seen that the forces L and R may be resolved into their x and y components lx, ly, rx and ry. Using the static relationships which describe the behavior of the spinning shaft 23, moment may be taken about the point Y3 and the following results:

$$Lx(a + b) + Rxb = rxc \quad (11)$$

$$\begin{cases} rx = \dfrac{Rxb + Lx(a + b)}{c} \\ ry = \dfrac{Ryb + Ly(a + b)}{c} \end{cases}$$

In like manner moments may be taken about the point Y4 providing the following results:

$$Lx(a + b + c) + Rx(b + c)lxc = 0 \quad (12)$$

$$lx = \frac{-Lx(a + b) - Rxb}{c} - \frac{Lxc}{c} - \frac{Rxc}{c}$$

$$\begin{cases} lx = -rx - Lx - Rx \\ ly = -ry - Ly - Ry \end{cases}$$

A polar conversion of the relationships obtained in 11 and 12 hereinbefore provides the following results:

$$\begin{cases} \vec{r} = rx + jry = \sqrt{(rx)^2 + (ry)^2}\ \tan^{-1}\left(\frac{ry}{rx}\right) = r \angle \theta r \\ \vec{l} = lx + jly = \sqrt{(lx)^2 + (ly)^2}\ \tan^{-1}\left(\frac{ly}{lx}\right) = l \angle \theta l \end{cases} \quad (13)$$

Having resolved the xy components of the unbalance forces due to the mass unbalance, having transposed the force to the planes of interest P1 and P2, and having converted the xy components to a polar form, the actual weights which must be applied at the rim of the assembly 21 in planes P1 and P2 to counterbalance the mass unbalance are determined by relating the forces to the corresponding weights at a predetermined diameter and the radian frequency of rotation for the shaft 23 at which the unbalance forces were detected. This conversion from force to weight is made as follows:

$$\begin{cases} Wl = \frac{2(lg)}{\omega^2 D} \text{ and} \\ Wr = \frac{2(rg)}{\omega^2 D}; \end{cases} \quad (14)$$

where $\omega$ is the angular velocity of shaft 23 in radians per second; D is the assumed diameter at which the weight will be applied; g is the acceleration of gravity and Wl and Wr are the left and right counterbalance weights respectively.

The manner in which the contribution made by an initially unbalanced shaft to the unbalance measurement is resolved involves spinning the shaft 23 without an external calibration weight or a wheel assembly mounted thereon. Any voltage vector which appears then corresponds to unbalance in the shaft alone. If these voltage vector magnitudes and phases are stored and subsequently subtracted from the summations or integrals obtained when the shaft is spun with either an external calibration weight or a wheel assembly applied thereto, the resulting integrals or summations represent the unbalance forces which are due only to the externally applied weight or the rotating body mounted on the shaft 23. It should be noted that in the discussion of the program flow charts hereinafter that it has been found to be convenient to construct the program to effect the calibrate run prior to the zero shaft unbalance run.

Occasionally it is desired to obtain what is static unbalance measurement. Static unbalance is defined as the sum of the right and left unbalance measurements which therefore disregards plane separation, offset and transducer separation. Static unbalance therefore amounts to the well known "bubble" balance. The relationships for static unbalance therefore appear as follows:

$$\begin{cases} rx + lx = rx + (-rx - Lx - Rx) = Lx - Rx \\ ry + ly = Ly - Ry \end{cases} \quad (15)$$

The unbalance measurement system to be described hereinafter performs the foregoing calculations at each of a predetermined number of angular increments for each revolution of the shaft 23. The force transducer outputs are digitized and operations performed thereon during the time interval in which the shaft is passing through each angular increment. The operations undertaken during each time interval relate to the combination of a sine representative quantity and a cosine representative quantity with the digitized force transducer outputs for that particular angular increment. This combination is performed in a fashion which is distinct from conventional multiplication of one digital number by another. The sine and cosine representative quantities are also selected so that the operation combining them with the digitized transducer outputs may be performed within a minimal execution time compared to the execution time required for conventional multiplication by a digital number representing the sine or cosine of the shaft angle. Further, the sine and cosine representative quantities are selected so that harmonic contribution to the combined quantities is minimized. The force transducer data which is digitized, combined with sine and cosine representative quantities and summed to provide sine and cosine coefficients thus provides processed data which is stored in memory until replaced by processed data from a subsequent run. Thus, the processed data is available for re-entry for recalculation if any of the settings at the offset dimension gauge 49, the display switch 44, or the keyboard 51 are entered in error or need to be changed for any reason. Recalculation is accomplished by resetting the corrected inputs at the control switches on panel 42 and lecting the calculate key marked "C" on the keyboard 51, as seen in FIG. 1. Detailed descriptions of the manners in which the combination of digital unbalance data with sine and cosine representative values is made, in which the sine and cosine representative values are selected to reduce harmonic contribution, and in which processed data is made available for recalculation will be addressed hereinafter.

Selection of dynamic unbalance measurement providing data in both planes P1 and P2 is available alternately with selection for the presentatin of static unbalance data by depression of the key marked "S" on keyboard 51. The alternate selection is obtained by successive depressions of the "S" key. When static unbalance measurement is selected, a numeral 5 (resembling the letter "S") is displayed in the center position of the left weight display 46.

As mentioned heretofore, the system disclosed herein provides for calibration which removes error arising from force transducer physical location and electrical idiosyncrasies as well as errors resulting from unbalance in the shaft 23. Such errors are measured by the system when the multiposition mode switch 43 is set at either the calibrate or the zero position. The shaft is spun with an appropriate calibration weight applied to the shaft at the point Y2 (FIG. 1) during the calibrate measurement. The shaft is spun in an unloaded condition during the zero, or shaft unbalance, measurement. The calibration constants are computed in accordance with the foregoing derived equations and stored as hereinafter described to be applied to each ensuing unbalance measurement when the mode switch 43 is positioned in the run position and a rotating body is spun on the shaft 23.

Figure 4:
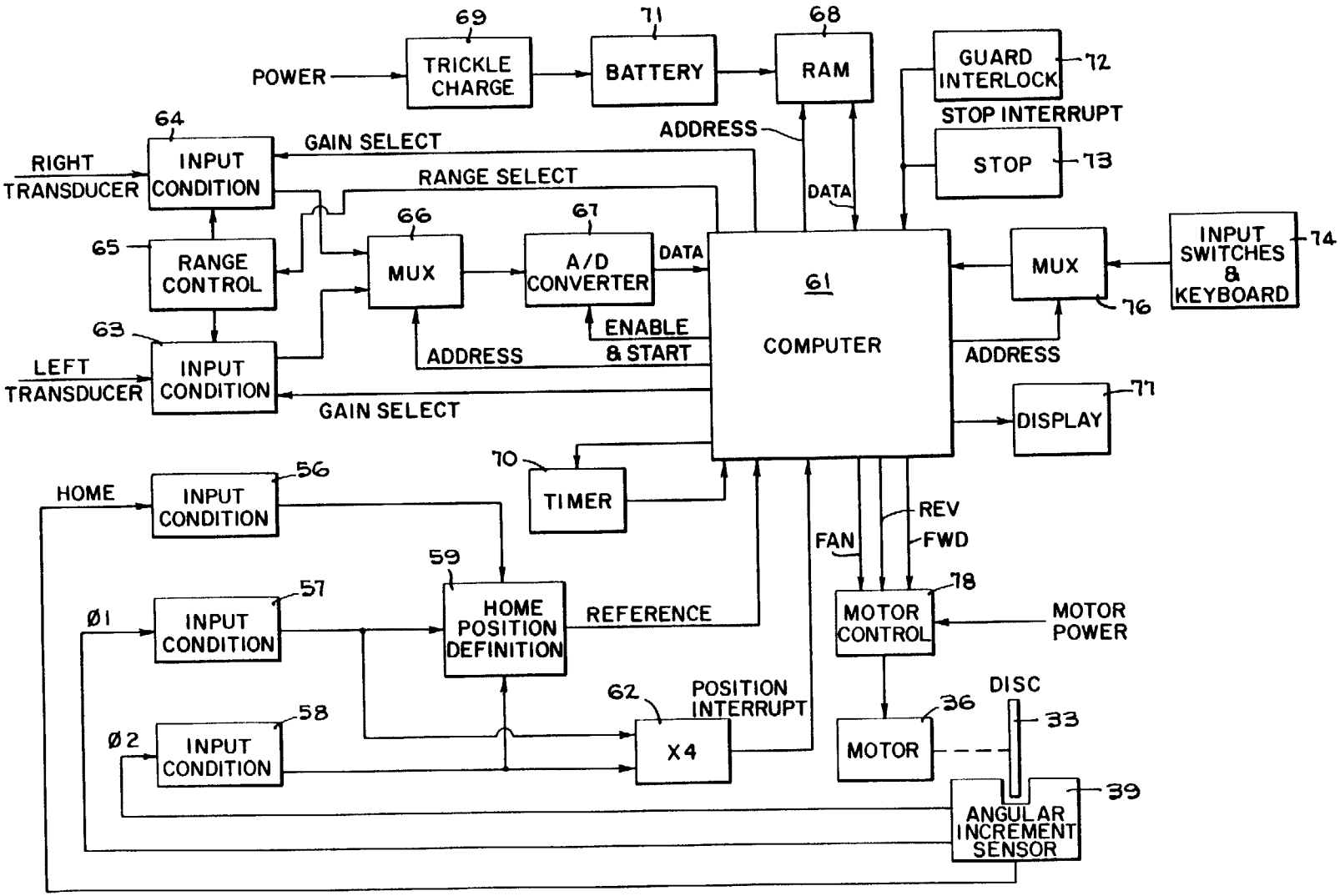
FIG. 4 is a block diagram of the electrical and electronic components of the unbalance measurement system of FIG. 1.

The block diagram of FIG. 4 shows the measurement circuitry segments contained within the console 41. FIG. 4 also shows the motor 36 together with the encoder disc 33 and the photosensor and light assembly 39 described in conjunction with FIG. 1. The photosensor and light assembly 39 operates to provide an angular increment sensing function which includes the provision of a pulse $\phi 2$ together with a pulse $\phi 1$ displaced 90° in phase from the pulse $\phi 2$. A "home" pulse is also provided by the photosensor and light assembly 39 once each revolution of the shaft 23. Each of the "home", $\phi 1$ and $\phi 2$ pulses are conditioned in conditioning circuit segments 56, 57 and 58 respectively to provide convenient pulse shapes and amplitudes. The conditioned "home" $\phi 1$ and $\phi 2$ pulses are coupled to a "home" position definition circuit 59 which provides a reference output coupled to a computer 61. The Fairchild F8 microprocessor is adequate as the computer 61. The conditioned $\phi 1$ and $\phi 2$ pulses are coupled to a "times four" multiplication circuit section 62 which provides a position interrupt signal also coupled to the computer 61.

The left and right force transducers 20 and 31 have their outputs coupled to conditioning circuits 63 and 64 respectively for the purpose of providing required signal amplitudes and some high frequency filtering. A range control 65 is provided for the transducer signal conditioning circuits so that a convenient scale factor is obtained for the conditioned signals. The range is selected by a control signal from the computer in a fashion to be described in greater detail hereinafter. In this emobidment the range control provides for a low range from 0 to 7 ounces in 0.05 ounce increments. A high range from 7 to 20 ounces provides readout in 0.1 ounce increments. The conditioned transducer signals are coupled to a multiplexer 66, which alternately passes the conditioned left and right transducer signals in analog form to an analog to digital (A/D) converter 67. The output from the A/D converter is provided in the form of digitized left and right transducer signals as data to the computer 61. It should be noted that the computer controls the gain of the input conditioning circuits 63 and 64 and provides the address function for the multiplexer 66. Computer 61 also enables and starts the A/D conversion accomplished in the converter 67.

A nonvolatile random access memory (RAM) 68 is provided which is coupled to the computer 61. The RAM 68 stores calibration and shaft unbalance constants obtained from calculations performed by the computer 61 and serves to provide the stored information on call by the computer. Power is provided to a trickle charge circuit 69 which maintains a battery 71 in a freshly charged state. The battery 71 provides the power for the RAM 68 so that a power failure or machine shut-down will not allow loss of the data stored in the memory. The computer 61 serves to provide an address for the RAM when storing or recovering data.

A mechanical guard (not shown) is provided to cover the rotating body mounted on the shaft 23 during an unbalance measurement run. The guard is intended for the safety of the operator and other personnel in the immediate vicinity and has a guard interlock 72 coupled thereto which provides a stop interrupt signal to the computer 61 when the guard is raised. A conventional stop function 73 is also provided which transmits a stop interrupt signal to computer 61 when selected. An array of input switches and keyboard switches 74 operated by the controls appearing on the front console 42 is scanned by a thirty-two line multiplexer 76. The multiplexer 76 is addressed in sequence by the computer 61 and provides the scanned data to the computer. A plurality of displays 77 are energized by the computer 61 in accordance with the data processed therein. The displays are seen on the front panel 42. The computer 61 also provides forward and reverse commands to the motor control 78 which relays motor power to the motor 36. A fan link is seen between the computer 61 and the motor control 78 to control cooling for the motor 36 as described hereinafter in greater detail. A timer 70, connected to and controlled by the computer 61, is provided as part of the control for the motor cooling.

Figure 2:
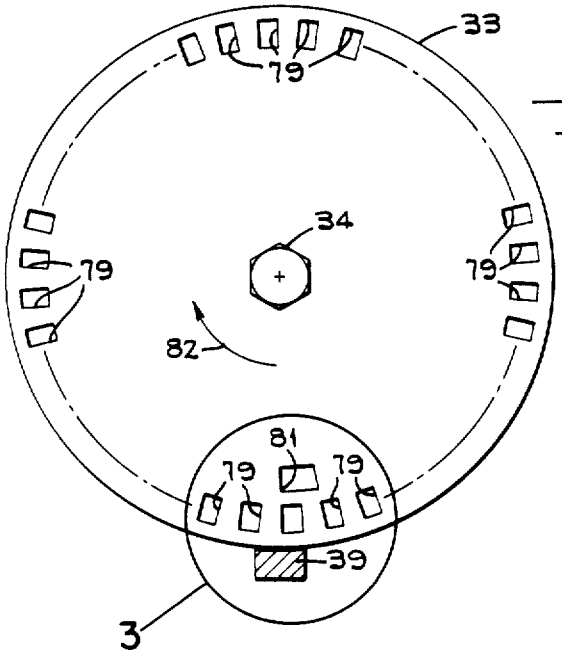
FIG. 2 is an enlarged side elevation taken along the line 2—2 of FIG. 1.

FIG. 2 the encoder disc 33 is shown having a plurality of apertures 79 near the periphery thereof at a predetermined number of angular increments. In the preferred embodiment apertures 79 are equally spaced in angular position about the periphery of the encoder and may be sixty four in number for example. A single "home" aperture 81 is shown also near the periphery of the encoder disc 33. Both the succession of angular increment indicative aperture 79 and the "home" aperture 81 pass between the light source and the photosensors in the photosensor and light assembly 39. Encoder disc 33 is rotated with the shaft 23 in the direction shown by the arrow 82 (clockwise) when viewed in the direction of the arrows 2—2 of FIG. 1.

Figure 3:
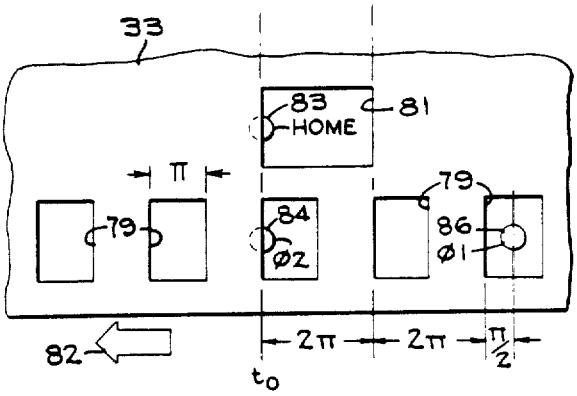
FIG. 3 is an enlarged fragmentary detail view of the encoding disc as indicated by the encircled portion 3 in FIG. 2.

In FIG. 3, a small segment at the periphery of the encoder disc 33 is shown in detail and is layed out in linear rather than angular fashion for the purpose of clarifying the explanation of the positional relationship between the various apertures. Arrow 82 shows the motion of the periphery of the encoder disc 33 which starts its clockwise rotation from an initial position as shown at a time $t_o$. At the time $t_o$ the leading edge of the "home" pulse aperture 81 is clearing a photosensor 83 in the photosensor and light assembly 39 and thereby produces the leading edge of the "home" pulse. At the same instant, $t_o$, the leading edge of one of the apertures 79 is clearing another photosensor 84 in the photosensor and light asembly 39 thereby providing a leading edge of the pulse $\phi 2$. Also at $t_o$ a third photosensor 86 in the assembly 39 is fully exposed to the light source therein through one of the apertures 79 thereby providing the pulse $\phi 1$. It is seen that the pulse $\phi 1$ is displaced from and leads the pulse $\phi 2$ by one quarter of a cycle ($\pi/2$) measured in terms of the period between adjacent apertures. 79. It may also be seen in FIG. 3 that the "home" pulse aperture 81 is made wide enough to cover one full cycle between adjacent angular increment indicative apertures 79 for a purpose to be herinafter explained in conjunction with the schematic of FIG. 5.

Figure 5:
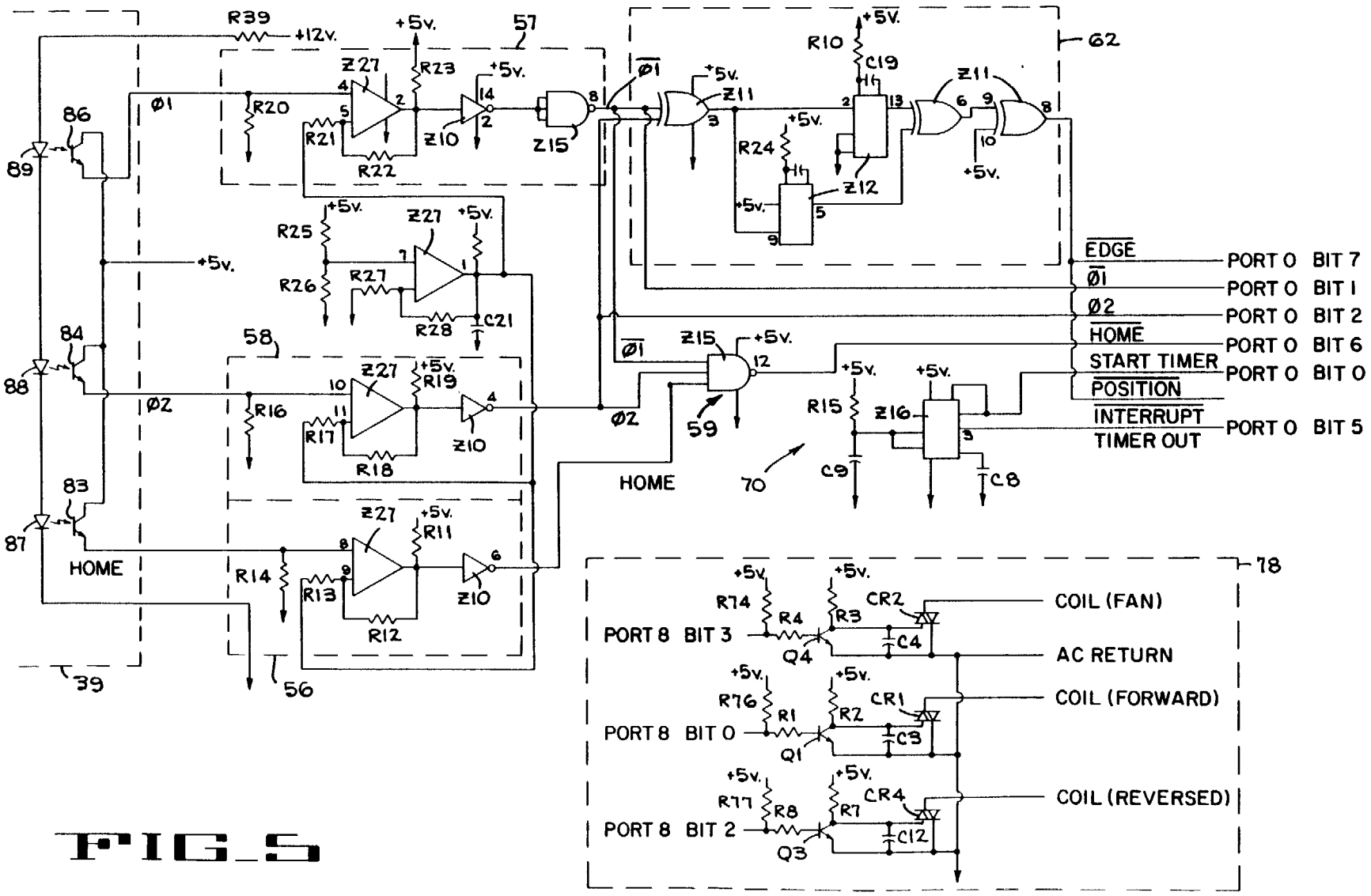
FIG. 5 is an electrical schematic diagram of one portion of the system of FIG. 4.
Figure 9:
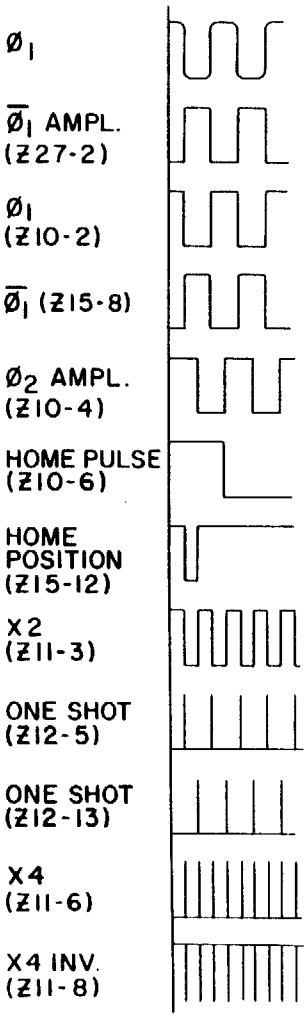
FIG. 9 is a timing diagram showing signals produced in the electrical circuit of FIG. 5.

Turning now to the electrical schematic diagram of FIG. 5 the photosensor and light assembly 39 is seen containing the photosensors 83, 84 and 86 for the generation of the "home" pulse, the $\phi 2$ pulse and the $\phi 1$ pulse respectively. The photosensors in this embodiment are excited by light emitting diodes 87, 88 and 89 as shown. A voltage divider including resistors R25 and R26 provides positive voltage to the noninverting input as pin 7 of amplifier Z27. The output from pin 1 of the amplifier Z27 serves as a threshold reference and is coupled to each of the noninverting inputs at pins 9, 11 and 5 three additional amplifying sections of Z27. The three additional amplifying sections of Z27 therefore act as voltage comparators receiving the "home" pulse, $\phi 2$ and $\phi 1$ ft the inverting input pins 8, 10 and 4 respectively. In this fashion the signals from the photosensors are squared and amplified to some extent. The squared and amplified pulses are inverted in the inverter sections Z10. The squared, amplified and inverted $\phi$pulse appears at Z10 pin 14. The squared, amplified and inverted $\phi 2$ pulse appears at Z10 pin 4. The squared, amplified and inverted "home" pulse appears at Z10 pin 6. The timing diagram of FIG. 9 shows the pulse $\phi 1$ as it is conditioned in the input conditioner 57 of FIG. 4 and as it appears at the output of the inverter Z10 pin 2. The squared and amplified pulse $\phi 2$ and the "home" pulse are also shown in FIG. 9 as they are conditioned in blocks 58 and 56 of FIG. 4 and as they appear at the output pins 4 and 6 respectively of the inverter sections of Z10 in FIG. 5. The input conditioning circuit 57 for the pulse $\phi 1$ includes a portion of the NAND gate Z15 which receives the amplified and squared pulse $\phi 1$ and provides a $\overline{\phi 1}$ pulse which is 180° out of phase with the $\phi 1$ pulse. The $\overline{\phi 1}$ and $\phi 2$ pulses are connected to the computer 61 at aport O bit 1 and port O bit 2 respectively.

The outputs from the input conditioning circuits 56, 57 and 58 seen as $\overline{\phi 1}$, $\phi 2$ and the "home" pulse in the timing diagram of FIG. 9 are connected to inputs of another section of the NAND gate Z15 as shown in FIG. 5. The NAND gate Z15 will produce a negative going output at pin 12 thereof at the point in time when all three of the aforementioned inputs are in a high state. This may be seen as the "home" position pulse in FIG. 9 indicated at Z15 pin 12 in FIG. 5. The leading edge of the negative going "home" position pulse defines the angular reference position for the rotating shaft 23 and is shown being connected to the computer 61 at port O, bit 6. The "home" position reference is used by the computer to calculate the relative phase of the force vectors sensed by the force transducers 29 and 31.

The schematic of FIG. 5 also shows the output $\phi 1$ and $\phi 2$ from the input conditioning circuits 57 and 58 being connected to inputs of an exclusive OR gate Z11 in the "time four" circuit section 62. A two input exclusive OR gate provides a low state output only when two inputs are simultaneously at the same level: e.g. both in a high state. The output from pin 3 of the OR gate Z11 in FIG. 5 may be seen as the "times two" output in FIG. 9. The "times two" output is connected both to the input pin 2 of the one-shot device Z12 and to the input pin 9 of another section of the one-shotdevice Z12. The one-shot section fired by the input to pin 9 provides a short pulse of about 15 microseconds at Z12 pin 5 on the negative going edge of the times two output from Z11 pin 3. The one-shop section of Z12 fired by an excitation at pin 2 provides at 150 microsecond pulse at output pin 13 thereof on the positive going edge of the "times two" output from Z11 pin 3. The alternating 150 microsecond spikes from the one-shot sections are connected to separate inputs on another section of the exclusive OR gate Z11. As shown in FIG. 5, the resulting output at pin 6 of the exclusive OR gate Z11 is driven to a high state by each of the alternating input pulses thereby providing a "times four" output at pin 6 as shown in FIG. 9. Another section of the exclusive OR gate Z11 is used as an inverter receiving the times four output at an input pin 9 and having a positive voltage coupled to another input pin 10. As a result each positive going spike in the times four input at pin 9 of the exclusive OR gate Z11 provides a negative going spike at the output pin 8 thereof. If disc 33 has sixty-four apertures 79 therein, 256 negative going pulses will be produced for each revolution of the shaft 23. The inverted "times four" output is connected to the computer 61 as an edge pulse at port O bit 7 and as a position interrupt pulse.

Also shown in the electrical schematic of FIG. 5 is a clock circuit component Z16 which, together with its associated circuitry functions as a timer 70, providing an output at pin 3 thereof. The timer is actuated by a start timer pulse received from port O bit O at computer 61. The timer output is connected to port O bit 5 of the computer 61 and provides a 15 second indication which is used to control the motor 36 as well as the rotation of cooling fan for the motor 36 in a manner to be hereinafter described.

The circuitry of FIG. 5 also shows the motor control section 78 which includes circuit structure operating to control the driving motor 36 for the shaft 23. A control pulse is provided from port 8 bit 0 of the computer 61to the base of a transistor Q1. When the transistor Q1 is turned off by the control pulse a solid-state triac CR1 is turned on which energizes the forward rotation coil in the motor 36. The motor 36 is braked by reverse energizing of the coil therein, and a control pulse for implementing the reverse function is coupled to the base of a transistor Q3 from the computer port 8 bit 2. When the transistor Q3 is turned off, the solid-state triac CR4 is actuated, thereby energizing the motor reverse coil. Since the motor 36 is a high power device so that the predetermined rotational speed may be obtained in a short time period, and since the motor is also braked by appropriate excitation applied to the motor windings, high power dissipation occurs within the motor. Therefore, a cooling fan for the motor is provided which is controlled by a signal from the computer port 8 bit 3 coupled to the base of a transistor Q4. When the transistor Q4 is turned off, the solid-state triac CR2 is also energized coupling AC power to the motor coil for the fan driving motor.

Figure 6:
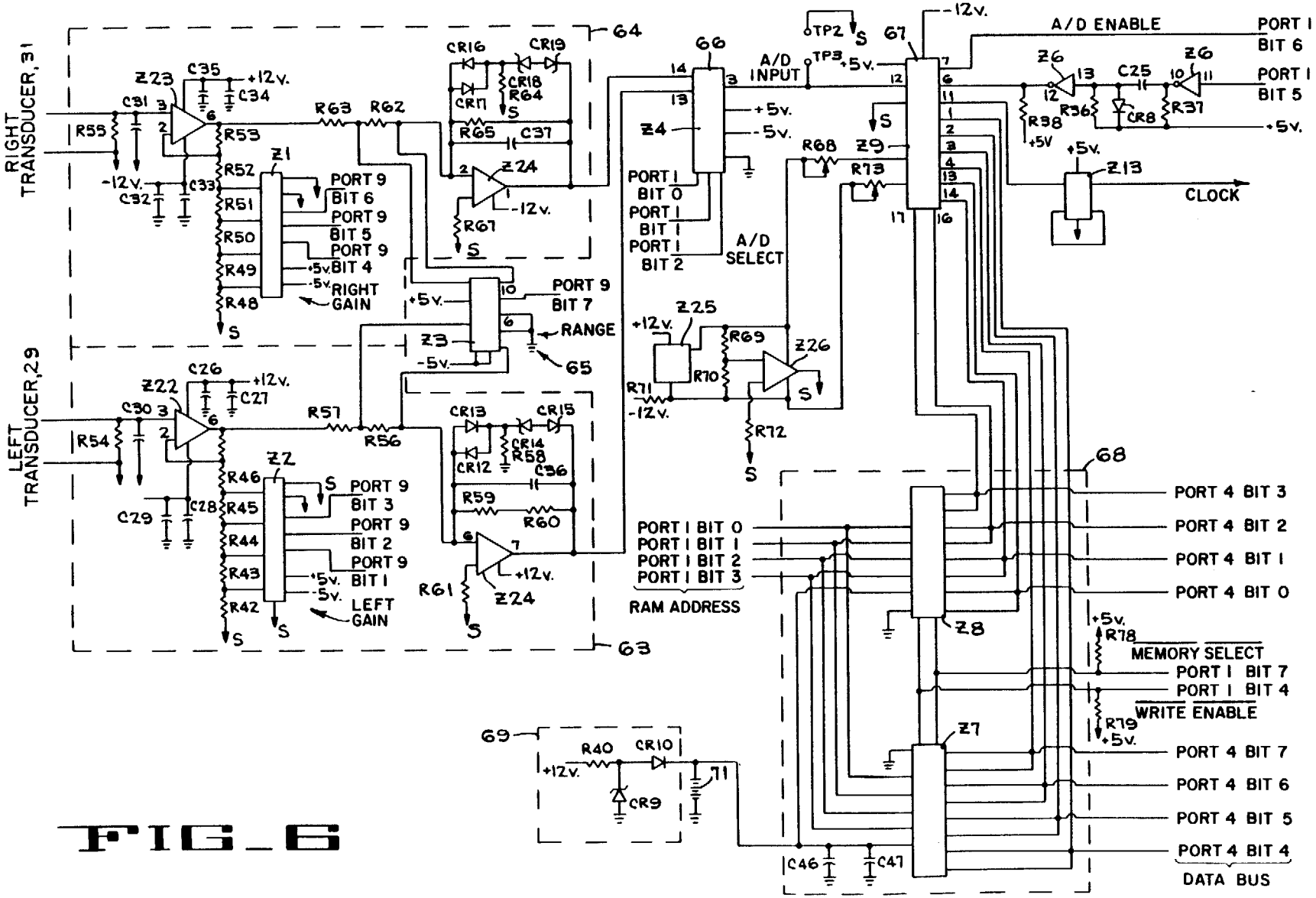
FIG. 6 is an electrical schematic diagram of another portion of the system of FIG. 4.

The electrical schematic of FIG. 6 shows the input portions of the circuitry for the signals from the right and left force transducers 31 and 29. The electrical signal from the right force transducer 31 is coupled to the noninverting input pin 3 of an amplifier Z23 in the input conditioning circuit 64. A multiplexer Z1 is also included which operates to select ones of the input resistors R48–R52 for adjustment of the gain of the amplifier Z23. The multiplexer Z1 is controlled by gain select signals from the computer 61 at port 9 bits 4, 5 and 6. The amplitude of the output at pin 6 of amplifier Z23 is therefore controlled in magnitude by the computer and coupled to the input pin 2 of one section of an amplifier Z24. The gain of the amplifier section Z24 at pin 1 thereof is a function of the input resistors R62 and R63 together with the feedback resistor R65. The gain at pin 1 is controlled by a range control signal from the computer port 9 bit 7 coupled to pin 10 of a range multiplexer Z3, shown as the range control 65 of FIGS. 4 and 6. The range multiplexer Z3 selectively removes the resistor R62 from the series combination of R63 and R62 at the input pin 2 of amplifier Z24, resistors R63 and R62 having appropriate value so that a 4:1 gain change is provided. Thus, a conditioned and amplified right force transducer signal is provided at the output pin 1 of amplifier Z24 which is coupled to input pin 14 of the multiplexer Z4 seen as item 66 in FIGS. 4 and 6.

The electrical signal from the left force transducer 29 is conditioned in a fashion similar to that for the signal from the right force transducer. The left force transducer signal is coupled to the noninverted input pin 3 of an amplifier Z22. A multiplexer Z2 is connected to provide a predetermined series combination of the resistors R42–R46 at the input pin 2 of amplifier Z22. In the same manner as the gain is controlled for the amplifier Z23 for the right force transducer signal, the computer 61 provides control from port 9 bits 1, 2 and 3 to select the desired input impedance at pin 2 of the amplifier Z22 in the input conditioning circuit 63, and therefore controls the gain at the output pin 6 thereof. The range control 65, represented by the multiplexer Z3 in the schematic diagram of FIG. 6, selects amplification range at pin 7 of the amplifier Z24 as follows. When the range multiplexer Z3 retains the input resistance R56 at pin 6 of the amplifier Z24 the high range is selected. Conversely, when the range multiplexer removes resistance R56 from the input of the amplifier the low range is selected. It should be noted that the amplification for the left transducer signal at pin 7 of amplifier Z24 is approximately twice that of the right transducer signal at pin 1 of amplifier Z24 for similar input resistances. The circuit is constructed in this fashion because the signal provided by the left force transducer is inherently smaller than that provided by the right force transducer. This may be seen by reference to FIG. 1 wherein it is clear that an unbalance force imposed on the system by a rotating body, such as the tire and rim assembly 21, will be counteracted by a lesser force at a greater lever arm at the left force transducer than is required at the lesser level arm at the right force transducer. The amplified electrical signal from the left force transducer is coupled to pin 13 of the multiplexer Z4, seen as item 66 in FIGS. 4 and 6.

The conditioned signals from the right and left force transducers are coupled to the multiplexer Z4 so that they may be passed alternately to the A/D converter Z9. Multiplexer Z4 is controlled by the computer 61 through port 1 bits 0, 1 and 2 and operates to alternately select the conditioned right force transducer signal and the conditioned left force transducer signal to appear at the output pin 3 thereof. The multiplexed force transducer signals are coupled to the input pin 12 on the A/D converter Z9, seen as item 67 in both FIGS. 4 and 6.

Analog to digital converter Z9 is a tristate device providing output bits which are high or low in the active mode and presenting a high impedance when in the inactive mode. Devices Z7 and Z8 in the random access memory 68 are also tri-state devices. The analog to digital converter Z9 and the random access memory devices Z7 and Z8 are activated alternately. Consequently, the 8-bit digital output from the analog to digital converter may be combined on the same data bus with the data from the random access memory 68. The digitized force transducer signals appear at pins 1–4, 13, 14, 16 and 17 of the converter Z9 and are coupled to the computer 61 at port 4 bits 0–7. The random access memory 68 is addressed by the computer from port 1 bits 0–3 and provides memory data on the data bus which is also fed to the computer at port 4 bits 0–7.

The random access memory 68 is termed a nonvolatile RAM because it is coupled to the circuitry 69 (FIG. 6) which prevents the memory data from being lost in the event of power failure to the system or when system power is purposely turned off. The battery 71 is trickle charged from an appropriate DC source through a resistor R40 and is regulated at 7.5 volts by the zener diode CR9 in this embodiment. The charge energy is passed by the diode CR 10 into the battery 71 and to the power input pin for the RAM 68. If the DC power supply fails, the battery 71 continues to provide power to retain the data in memory. The random access memory 68 stores the settings for the gain selection made at the gain multiplexers Z1 and Z2, as well as the four calibration constants seen in equations (8), and the four zero shaft unbalance constants discussed hereinbefore.

The analog to digital converter 67 is coupled to a two-megacycle clock through a divide-by-two circuit Z13. The enabling input at pin 7 of the A/D converter 67 is connected to the computer 61 at port 1 bit 6. A very short pulse, in the order of two microseconds in width, is required at the input pin 6 for the AD converter 67 to start the analog to digital conversion. This pulse is obtained by receiving a ten microsecond pulse from port 1, bit 5 of the computer 61 at the input pin 11 of an inverter Z6. The inverted ten microsecond pulse is differential in the circuitry containing capacitor C25 and resistor R36. The steep leading edge of the inverted pulse provides a negative going spike which is coupled to the input pin 13 of a second inverter Z6, thereby providing a squared, positive going approximately 2 microsecond spike at the output pin 12 thereof.

Figure 7:
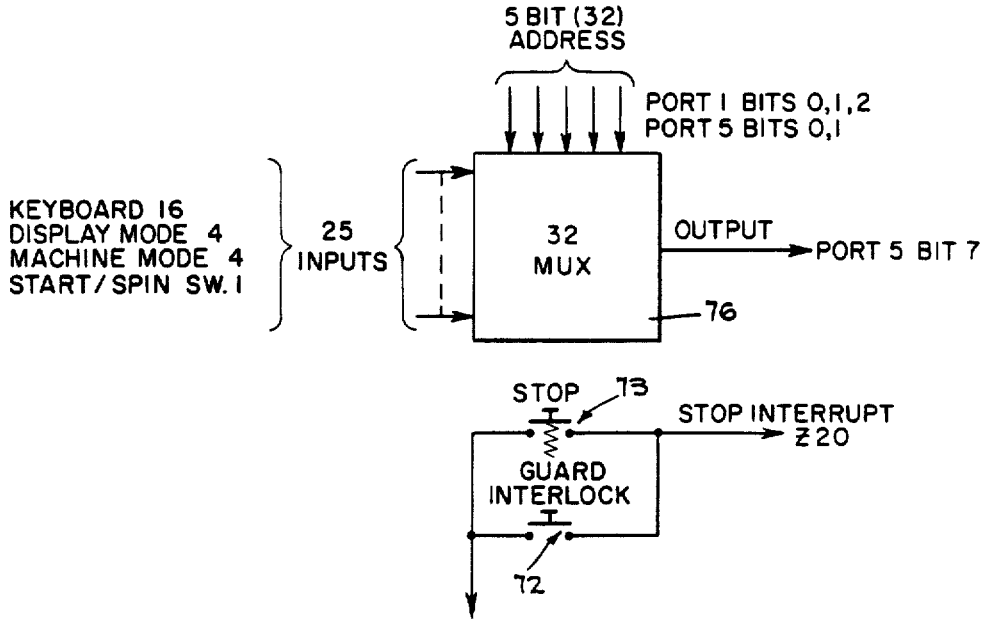
FIG. 7 is an electrical schematic of the keyboard inter-connection portion of the system of FIG. 4.

FIG. 7 shows the input multiplexer 76 receiving twenty five inputs from the input switches and keyboard 74. The keyboard 51 (FIG. 1) provides up to sixteen such inputs, the display mode switch 44 provides four switch inputs, the machine mode switch 43 provides three switch inputs (together with a possible fourth self-test input) and the start/spin switch 45 provides. one input. The twenty-five inputs from the front panel 42 are scanned in succession by the multiplexer 76 as directed at the five bit address from the computer 61. The address lines are connected to the computer port 1 bits 0, 1 and 2 and computer port 5 bits 0 and 1 in this embodiment. The output from each of the scanned inputs is directed to the computer port 5, bit 7. FIG. 7 shows also a spring loaded normally open stop switch 73 which provides a ground signal to the stop interrupt port at the computer 61. A switch is shown representing the guard interlock switch 72 which provides a ground to the stop interrupt port on the computer 61 when the guard (not shown) for the rotating body mounted on the spin shaft 23 is lifted from its protective position to be placed in an out of the way position. The multiplexer 76 looks at each of the twenty-five inputs in sequence during each line scan. The series of high signal states for an unactuated switch and low signal states for an actuated switch during each scan provide the setting data at the output to port 5 bit 7. In this fashion, the computer implements those portions of the programmed routines which are selected by the control switches.

Figure 8:
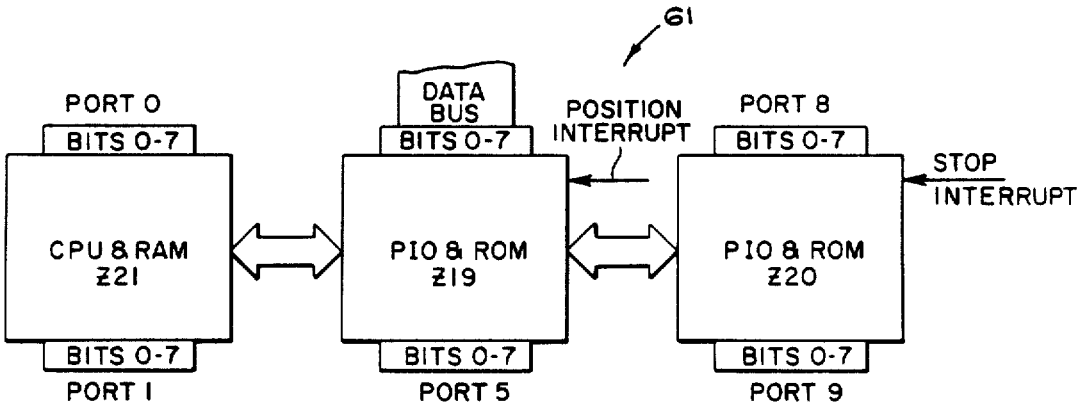
FIG. 8 is a block diagram of the computer of FIG. 4.

Turning to FIG. 8 a simplified block diagram of the computer 61 is shown. The computer of FIG. 8 is properly represented by the Fairchild F8 device, available from Fairchild Semiconductor, Mountain View, Ca., and includes a central processing unit (CPU) Z21, including random access memory. The CPU is coupled to a pair of peripheral input output (PIO) devices Z19 and Z20 containing read only memory. The stop interrupt indication is connected to the PIO section Z20 which contains ports 8 and 9 thereon each including bits 0 through 7. The position interrupt signal is connected to the PIO section Z19 which contains ports 4 and 5 thereon each including bits 0–7. The data bus is connected to port 4 bits 0–7 on PIO device Z19. The central processing unit Z21 has ports 0 and 1 each with bits 0–7.

Figure 10:
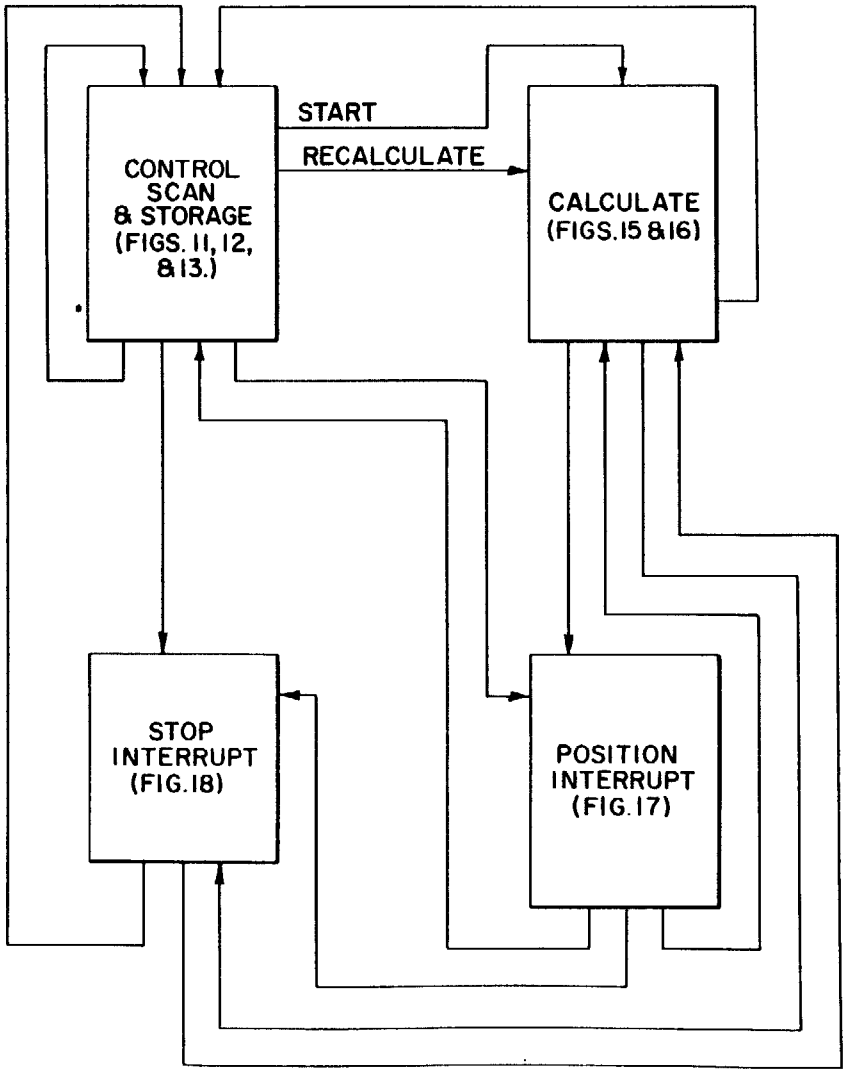
FIG. 10 is a general flow diagram for the program functions of the computer of the present invention.
Figure 11:
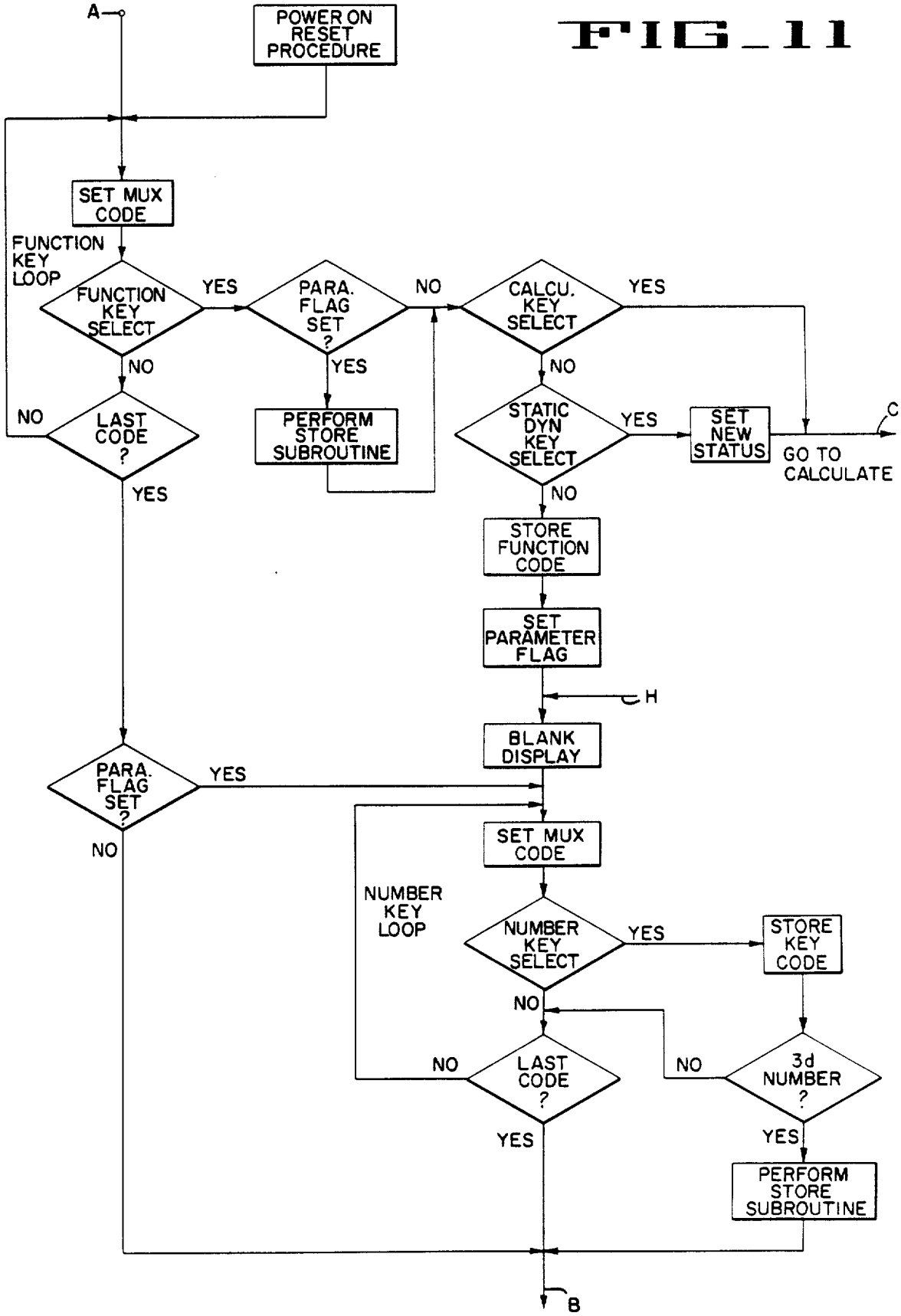
Figure 12:
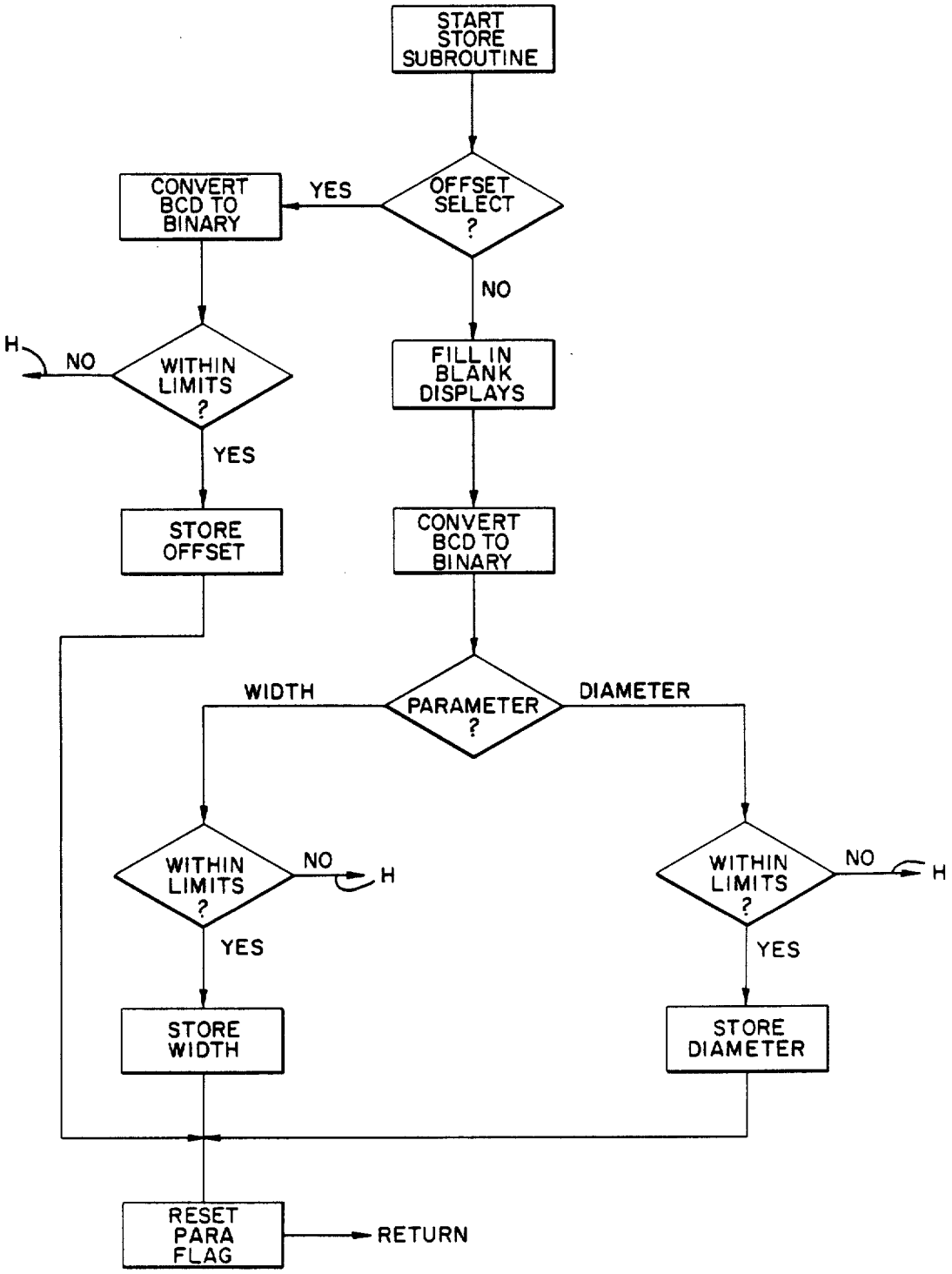

Turning now to FIG. 10 of the drawings a generalized flow chart for the program instructions implemented by the computer 61 is shown. A control scan and storage function represented in more detail by the flow diagram of FIGS. 11–13 is performed. The control scan is repeated until some function is selected and detected which causes ones of the other routines to be implemented. A start selection will cause the calculate routine to be initated. Calculate or a static/dynamic switch selection as well as any display mode changes will cause a recalculate command to the calculate routine. The calculate routine, in turn, provides information to the control scan portion of the program at the completion of the calculations. The control scan may also initate the stop interrupt in response to appropriate switch selection, as hereinbefore described, or it may initiate the position interrupt routine, as also hereinbefore described. Information is provided to the control scan and storage portion of the overall program on completion of either the stop or position interrupt routines. A return may be made from the position interrupt routine to the control scan, the stop interrupt or the calculate routines, as will hereinafter be described. The calculate routine may require that the position interrupt routine be implemented, the stop interrupt routine be implemented, or the control scan be continued. The details of the routines represented by these major segments of the program flow may be found on the indicated figures associated with each of the major program portions.

In FIG. 11 a portion of the control scan routine is shown wherein a power-on reset procedure is performed by the program when the power is initially applied to the system. All registers in the system, except those in the non-volatile ram 68, and all displays are cleared by the reset prodecure. When in normal operation, point A in the program is entered from those points in the subroutines indicated hereinafter. Thereafter, the code in the multiplexer 76 is set to sample one of the multiplexed inputs in the function key loop and the inquiry is made as to whether a function key has been selected. If the answer is no, the inquiry is made as to whether this is the last code to be looked at in the function key loop. Five codes are observed in each code scan for this loop. Those codes relate to the width, offset and diameter parameters for the rotating body to be tested, and to the static-dynamic and calculate keyboard selections. After the last of the five codes has been scanned without any function key selection an inquiry is made as to whether a flag in the computer for any of the three parameters, offset, width or diameter, has been set. A parameter flag setting is an indication in the computer of partial or incomplete inputs received relative to the particular parameters or an indication that the data for one of the aforementioned three parameters is being inputted.

If the parameter flag setting answer is no, the routine proceeds to point B as indicated. If the parameter flag setting is yes, then the code in the multiplexer 76 is set to sample one of the multiplexer inputs in the number key loop and an inquiry is made as to whether a number key is selected. If the answer is no, the inquiry is made as to whether the last number code has been scanned. There are ten number keys so that the last code will be the tenth code. Therefore, the number key loop will be traversed ten times and if no number keys are selected after the tenth instruction to look at a number key, the routine proceeds to point B as indicated. In the event a number key is selected the key code is stored and an inquiry is made as to whether it is the third number selected. Three place inputs are provided for the parameter settings. If it is not the third number selected, then the routine is returned to the number key loop to look for the complete parameter number description. If the third number has been selected, the storage subroutine is performed for that parameter set value. Thereafter, the routine is returned to point B as indicated.

In the event a function key has been selected in the portion of the routine relating to the function key loop a further inquiry is made as to whether a parameter flag has been set. If the answer is yes, then the storage subroutine is performed for that function key. Thereafter, an inquiry is made as to whether the calculate key has been selected. If no parameter flag is set the inquiry is made directly as to whether the calculate key has been selected. If the answer is yes, the routine is directed to go to calculate at point C as indicated in FIG. 11. If the answer is no, an inquiry is made as to whether the static/dynamic key is selected. If the answer is yes, then a new status setting is indicated and the routine is directed to go to calculate at point C. If the answer is no, the function code is stored and the parameter flag is thereafter set. The displays are blanked and the routine proceeds into the number key loop portion described previously.

The performance of the storage subroutine in FIG. 11 is indicated at two points therein and is shown in detail in FIG. 12. The storage subroutine is started and the inquiry is made as to whether the offset selection has been made. If the answer is yes, the binary coded decimal selection is converted to binary and the inquiry is made as to whether the selection is within limits. If the answer is no, display 54 is blanked and the routine proceeds back to point H in the subroutine of FIG. 11. If the answer is yes, the offset is stored, the paramenter flag is reset and the routine is returned to the appropriate point as indicated in FIG. 11.

In the event the offset selection inquiry provides a no answer, any blank display windows for the width or diameter displays 52 and 53 are filled in with zeroes and the resulting binary coded decimal parameter setting is converted to binary form. Next the width or diameter parameter is interrogated. If the width parameter has been selected an inquiry is made as to whether the width setting is within predetermined limits. If the answer is no, the routine returns to the point H in the subroutine of FIG. 11 and the display 53 is blanked. If the answer is yes, the width setting quantity is stored, the parameter flag is reset and the routine is returned to the appropriate point as explained hereinbefore. In the event the diameter parameter has been selected, the inquiry is made as to whether the setting is within predetermined limits and if the answer is no, the diplay 52 is blanked and the routine is directed to the point H in the subroutine of FIG. 11. If the answer is yes, the diameter value is stored, the parameter flag is reset and the routine is returned to the appropriate point in the routine of FIG. 11.

In FIG. 13 a program flow chart is shown having an entry point B corresponding to the point B in FIG. 11. At this point in the routine the multiplexer 76 code is set to sample one of the multiplexed inputs in the switch loop by looking at the display mode switch 44 and the machine mode switch 43. An inquiry is made as to whether the output put of the multiplexer 76 indicates that a switch setting has been selected. In the event the answer is no, the inquiry is made as to whether this is the last code to be interrogated in this part of the routine. There are eight switch settings to be sampled during the switch loop interrogation. There are four settings for the display mode switch 44 and a possible four settings for the machine mode switch 43 as hereinbefore described. If one of the switches is shown to be selected then the status of the switch is calculated and compared with the current status in a status register. The status register is shown in FIG. 14 and contains information relative to the settings of the display mode and machine mode switches. If the display has been selected for ounces, a zero is seen in the third bit, whereas if grams are selected, a one appears. If the display mode quantity is selected to be rounded off to the nearest ounce or gram, a zero appears in the second bit while a one appears if the round-off function is not selected. Further the status register includes an indication of the machine mode selected in bits 4 and 5. As indicated in FIG. 14 bits 4 and 5 will appear as 11 for the run mode, as 01 for the calibrate mode and 00 for the zero shaft unbalance mode. As hereinbefore suggested, a self-test mode may be implemented appearing in the status register at bits 4 and 5 and 1 and 0 when selected.

It should also be noted that bit 6 in the status register is indicative of whether static or dynamic unbalance information is selected. If dynamic information is desired a zero will appear in bit 6 of the register. When the low range is selected by the range multiplexer 65 seen in FIG. 6, the seventh bit in the status register of FIG. 14 will appear as a zero. Conversely, when the high range is in use, a one will appear as the seventh bit. If one of the three parameters, diameter, width or offset, is being entered, the first bit in the status register will appear as a one, whereas if none of these parameters are being entered the first bit in the status register will appear as a zero.

After the status has been calculated and compared with the previous status contained in the status register of FIG. 14, an inquiry is made as to whether the status has been changed. If the answer is no, the inquiry is made as to whether this is the last of the eight codes to be reviewed in the switch loop. The next switch status is reviewed from the multiplexer 76 if the anser is no. In the event the status has changed as indicated by comparison with the previously set status of FIG. 14, then the inquiry is made as to whether it is the display mode that has changed. If the answer is no, the routine is returned to the last code inquiry. If the answer is yes, then the routine is returned to the calculate portion as indicated at point C.

After the last of the eight switch codes scanned by the multiplexer 76 has been reviewed and the answer to the "last code" inquiry is yes, the multiplexer 76 is advanced to look at the status of the start spin switch. If the start switch has been depressed, then the routine is returned to the start spin point indicated as D in FIG. 15. If the start spin switch has not been depressed, then an inquiry is made as to whether the timer register indicates zero. The timer register is loaded with a number to preset a predetermined total amount of time from the 15 second timer 70 which functions in conjunction with the timer loop indicated in FIG. 13. For example, if the timer loop is desired to be set for five minutes then the timer register will be loaded with a number count of 20. If the timer register does not show a zero count, then it is inquired as to whether the 15 second timer 70 is on. If the answer is yes, then the routine is returned to point A in FIG. 11 as indicated. If the answer is no, the timer 70 is restarted and the time register is decremented by one count. Thereafter, the routine is returned to the point A in FIG. 11. When the timer register eventually reaches a zero count, a fan-off output code is emitted from the computer 61 which terminates the rotation of the cooling fan for the motor 36. In this fashion the cooling fan for the motor is retained in an on condition for five minutes, in this example, after the motor start switch is sensed to be in the off position.

Figure 15:
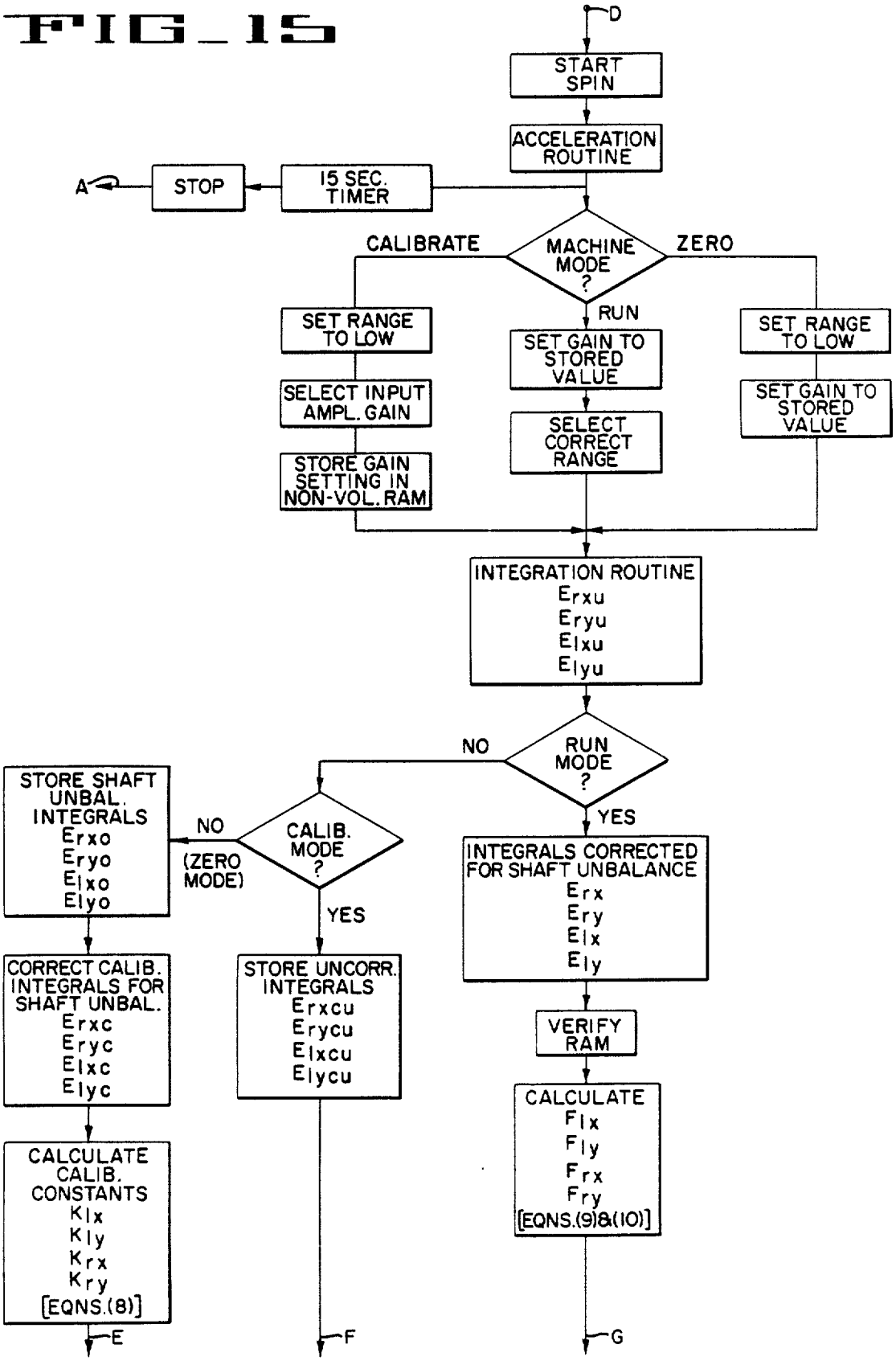
FIGS. 15 and 16 are program flow diagrams for the calculate subroutine of the program of FIG. 10.
Figure 16:
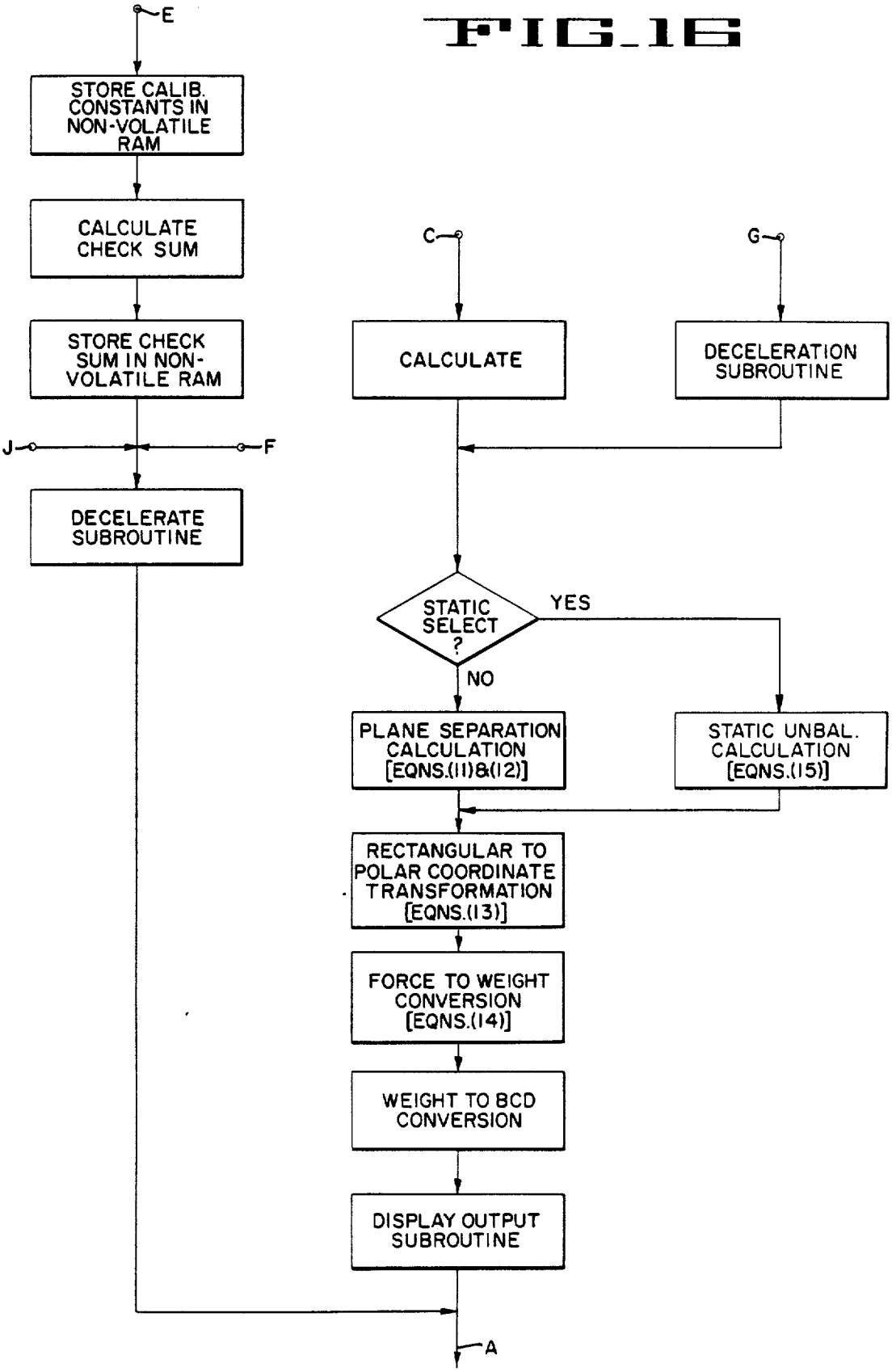

The flow chart of FIG. 15 shows a portion of the calculate routine wherein entry is made from point D in FIG. 13. If the start spin switch is selected, then a start spin instruction is provided which initiates an acceleration routine for the spin shaft 23. The acceleration routine measures the speed of the spin shaft and if the speed does not reach a predetermined level within a fifteen second period provided by the timer 70, a stop command is provided by the program and the routine is returned to point A in FIG. 11. If the predetermined speed level is attained within the fifteen-second period, the selected machine mode is queried. If the machine mode switch 43 is set to the calibrate position, the range multiplexer 65 is set to provide the low range and the gain control multiplexers Z1 and Z2 in input conditioning circuits 64 and 63 respectively are selected to provide left and right force transducer scale factors (signal magnitude per unit of unbalance force) which are substantially the same. It is recognized that the signal levels from the right force transducer will be considerably higher than the signal levels from the left transducer due to the difference in lever arms from the location of the unbalance forces in the planes P1 and P2 as hereinbefore described. The selected amplifier gain values for the gain control multiplexers Z1 and Z2 are stored in the nonvolatile RAM 68. The program then proceeds to an integration routine, explained more fully hereinafter, which provides summed and rounded off digital combinations containing sine and cosine representative factors for the right and left transducer signals which combinations are uncorrected for errors. These quantities containing sine and cosine factors, are designed as Erxu, Eryu, Elxu and Elyu as seen in FIG. 15. Next, an inquiry is made as to whether the machine mode switch is in the run mode. In this instance the answer is no and inquiry is made as to whether or not the machine mode switch is yes, and the uncorrected integrals obtained in the integration routine are stored as uncorrected calibration integrals which exist at the point in the routine indicated at F in FIG. 15. The uncorrected calibration integrals are indicated as Erxcu, Erycu, Elxcu and Elycu, as seen in FIG. 15. In FIG. 16 the point F is shown entering the deceleration subroutine after which the routine is returned to point A in FIG. 11. The calibration run is undertaken first so that the gain multiplexers Z1 and Z1 in FIG. 6 are set as described with the known unbalance weight mounted on the spin shaft. The same gain is used in the zero calibration mode and all ensuing run mode operations until another calibration run is undertaken.

As seen in FIG. 15, when the machine mode decision indicates that the zero shaft unbalance mode has been selected, the range multiplexer 65 is again set to the low range and the gain values selected and stored in the nonvolatile ram 68 during the calibrate routine are retrieved and set at the gain control multiplexers Z1 and Z2 of FIG. 6. The integration routine ensues providing unbalance measurements. The inquiry is made as to whether the run mode is selected at the machine mode switch 43 and in this instance the answer is no. The next inquiry is whether or not the machine mode switch is at the calibation setting and in this instance the answer once again is no, because the zero mode is set. At this point in the routine of FIG. 15 the integrals obtained as the digital combinations containing summed sine and cosine factors in the integration routine are stored as the shaft unbalance integrals identified as Erxo, Eryo, Elxo, and Elyo as indicated in FIG. 15. Thereafter the stored uncorrected integrals, Erxcu, etc., obtained in the calibration mode are retrieved and corrected for shaft unbalance, thereby providing the corrected calibration integrals, Erxc, Eryc, Elxc and Elyc. As explained in conjunction with the calculation equations provided hereinbefore, specifically relationships (8), the calibration constants are calculated from the corrected calibration integrals and the routine proceeds to point E as indicated in FIG. 15.

As seen in FIG. 16 the point in the routine indicated at E is located at a point where the calibration constants are stored in the nonvolatile RAM 68. At this point a check sum is calculated. The check sum is obtained by taking the four stored shaft unbalance integrals and the four stored calculated calibration constants together with the stored gain setting and subtracting the sum of these values from zero. A negative number check sum results. Then when these values are called up from the nonvolatile RAM 68 and added to the check sum a zero remainder should result. The check sum is also stored in the RAM 68. Thereafter, the decelerate subroutine is entered and the routine is returned to point A in FIG. 11.

Returning once again to the machine mode switch selection in FIG. 15, if the run mode is selected the stored gain control value is set in the gain multiplexers Z1 and Z2 in the left and right force transducer input conditioning circuits 63 and 64. The proper range is set in the range multiplexer 65 in accordance with whether relatively large or relatively small unbalance forces are being measured by the system. Thereafter the integration routine is entered which is undertaken for any of the machine mode settings, calibrate, zero shaft unbalance or run modes, but will now be explained in detail in connection with the run mode. The integration routine first looks at the right force transducer signal as selected by the multiplexer 66 (FIG. 6) and starts the A/D converter 67. The digitized right force transducer unbalance signal is obtained as a digital word on the data bus. The encoder pulse is then obtained from the "times four" circuit 62 of FIG. 5, which pulse provides angular orientation information relative to the "home" position pulse (FIG. 9). The digitized right transducer unbalance force is now multiplied by a number which is retrieved from a ROM position in the computer 61. The retrieved number is representative of the sine of the angle indicated by the obtained encoder pulse so that a quantity including a sine factor is provided by the multiplication. This quantity is then added to the sum of similar quantities obtained during a single revolution of the shaft at the preceding "view" points. The digitized right transducer unbalance force is also multiplied by a number representative of the cosine of the angle indicated by the encoder pulse. As with the sine quantities, the product of the multiplication is added to the sum of the previously obtained cosine quantities during the processing revolution of the shaft. The total integration routine includes a repeat of the foregoing steps for the left force transducer signal including digitizing the left transducer unbalance force, obtaining the angular orientation from the encoder pulse, retrieving a sine representative value from memory, sine processing (multiplication), sine representative quantity summation, retrieving a cosine representative value from memory, cosine processing (multiplication), and cosine representative quantity summation. The x and y coefficients for the fundamental component in the transducer signals corresponding to the unbalance force are thus obtained.

It should be explained at this point that the sine and cosine representative values which are used in processing the digitized force unbalance signals are permanently stored in memory within computer 61 and retrieved therefrom at corresponding angular increments of rotation of the shaft 23. Sampling theory requires that at least two samples (establishing two angular increments) be taken each cycle for the fundamental frequency of interest. If higher frequencies are present in the sampled waveform then a higher number of samples are required each cycle. Further, in the interests of obtaining better resolution and accuracy in a system measurement, a higher number of samples per cycle is desired. An upper limit of the number of samples is established by the costs and speeds of available processing components.

Figure 19:
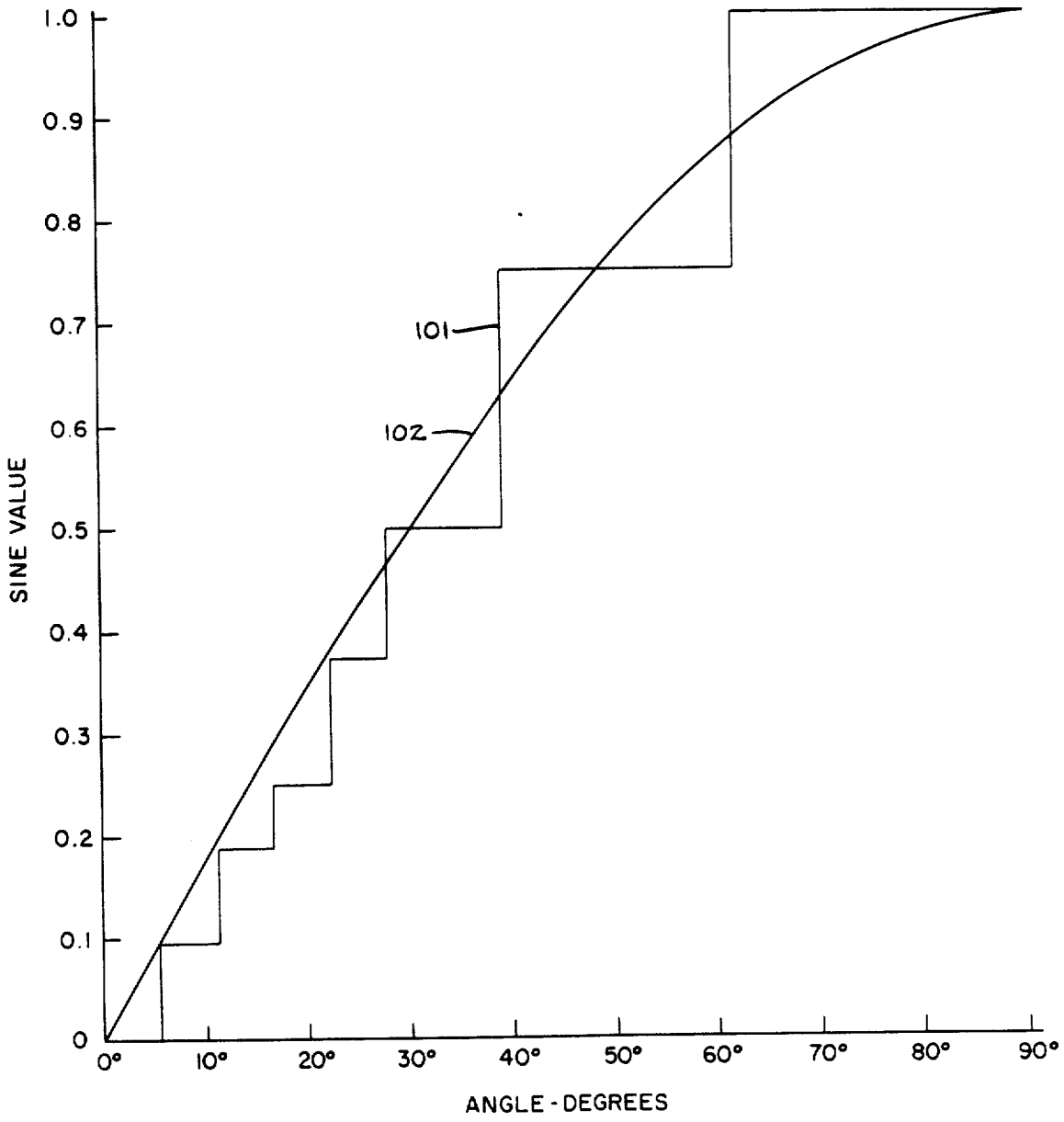
FIG. 19 is a diagrammatic representation of the pseudo-sine function used in the computer of the present invention.

The stored sine and cosine representative values are referred to generally as the extraction functions. In this embodiment sixty-four apertures 79 have been formed in encoder disc 33. There are therefore 64 angular increments in each full revolution of the shaft 23. This means that the entire integration routine described herein will be repeated 64 times for each shaft revolution or 16 times for each quarter revolution. The angular increment in this instance is therefore approximately 5.62 degrees. The extraction function sine and cosine values which are selected for each angular increment are only approximations for the particular angle. They are selected specifically to provide minimal contribution of harmonics to the Fourier coefficients resulting from the processing of the digitized force unbalance signals by the extraction function. Table I shows the sine representative values in binary and decimal form which are used in the integration routine for the 16 increments in the first quarter of each revolution of shaft 23. The binary numbers are seen to have no more than two bits set to a binary one level. A graphic representation of this form of the extraction function may be seen as the stepped sine approximation curve 101 in FIG. 19, which is compared to a pure sine wave quadrant depicted as curve 102.

TABLE I

| Angular Increment | From | To | Sine Value | Binary | Decimal |
|---|---|---|---|---|---|
| 0 | 0 | 5.62° | 0 | 0000 0000 | 0 |
| 1 | 5.62 | 11.19 | 0.094 | 0000 0110 | 6 |
| 2 | 11.19 | 16.81 | 0.187 | 0000 1100 | 12 |
| 3 | 16.81 | 22.43 | 0.250 | 0001 0000 | 16 |
| 4 | 22.43 | 28.05 | 0.370 | 0001 1000 | 24 |
| 5-6 | 28.05 | 39.30 | 0.500 | 0010 0000 | 32 |
| 7-10 | 39.30 | 61.80 | 0.750 | 0011 0000 | 48 |
| 11-15 | 61.80 | 90 | 1.000 | 0100 0000 | 64 |

It should be noted that the maximum sine value in this example has a magnitude represented by decimal number sixty-four. The lesser values represent specific fractions of the maximum value. For example, the decimal value thirty two represents the sine value 0.5 which is precise only for an angle of thirty degrees in the first quadrant (or 330° in the fourth quadrant). As stated previously herein, these values have been judiciously selected to be applied during one or more specific angular increments for the purpose of suppressing contribution of harmonic content to the summed quantities containing sine and cosine factors and which represent the Fourier coefficients for the fundamental frequency in the Fourier series. The degree of contribution to harmonic content for one set of extraction functions is demonstrated in Table 2 herein which sets forth the harmonic content in the summed quantities for the circumstance wherein the unbalance force is coincident with the "home" position and the force unbalance signals are pure sine waves.

TABLE II

| Harmonic | Sine Coefficient | Cosine Coefficient |
|---|---|---|
| Fundamental | 1.02794 | Zero |
| Second | 0.00000 | " |
| Third | 0.06599 | " |
| Fourth | 0.00000 | " |
| Fifth | 0.01393 | " |
| Sixth | 0.00000 | " |
| Seventh | 0.00037 | " |
| Eighth | 0.00000 | " |
| Ninth | 0.02505 | " |

The details of the processing to which the digital unbalance force signals are subjected by the disclosed apparatus will now be discussed. It should be noted that each of the binary forms of the sine factors in Table I contain only one bit or, at the most, two information bits set to a one state. Such bits will hereinafter be defined as bits of primary interest. The purpose of this arrangement is to decrease the execution time required for signal processing (i.e., the multiplication operations) so that each of the operations on the two digitized force transducer signals may be performed during each of sixty-four angular increments in each revolution of the shaft 23. By way of illustrating that the time saving feature is accomplished. Table III is presented which sets forth all of the register shift and addition steps which are accomplished during an 90° angular excusion of the shaft 23 in multiplying th digital sine function, or extraction function, with the digitized unbalance force output data to provide the integrals including a sine factor for either the left or right force transducer. Since an integral including a sine factor is provided for each of the left and right transducers and an integral including a cosine factor is also provided for each of the left and right transducers during each angular increment, each operation is performed four times as the shaft passes through each angular increment set forth in the left columns of Tables I and III. Thus, 256 shift and summation operations must take place for each revolution of the shaft 23 in this example. The "operations required" shown in the right column of Table III are performed on the digitized unbalance force output data for each angular increment to effect data processing. Where "add" is indicated, the data at that point in the process is added to the integration register. New data is subjected to the operations for each angular increment as noted.

TABLE III

| ANGULAR INCREMENT | DIGITAL SINE FACTOR | OPERATIONS REQUIRED |
|---|---|---|
| 0 | 0 | |
| 1 | 110 | Shift left once<br>Add<br>Shift left once<br>Add |
| 2 | 1100 | Shift left twice<br>Add<br>Shift left once<br>Add |
| 3 | 10000 | Shift left four times/add |

TABLE III-continued

| ANGULAR INCREMENT | DIGITAL SINE FACTOR | OPERATIONS REQUIRED |
|---|---|---|
| 4 | 11000 | Shift left three times<br>Add<br>Shift left once<br>Add |
| 5-6 | 100000 | Shift left five times/add |
| 7-10 | 110000 | Shift left four times<br>Add<br>Shift left once<br>Add |
| 11-15 | 1000000 | Shift left six times/add |

In summary, the analog to digital output register takes the digitized data in. The read only memory in the computer 61 containing the pseudo sine and cosine factors is addressed by the computer to retrieve the sine and cosine factors corresponding to the angular increment at which the shaft 23 is now located. The operations of Table III corresponding to the current angular increment are performed on the data in the data analog to digital output register and the resultant products are added to the integration registers to obtain the four running summations for each increment.

When it is considered that conventional multiplication is a process involving data retrieval, data storage and a series of data additions for each bit in a least to most significant bit sequence, it may be seen by reference to Table III that the time consuming storage operations and most of the addition operations usually required are not necessary in the disclosed process and that the addition operations do not exceed two in any instance in this example and sometimes are required only once. It should be realized that the actual process involving the multiplication of a pseudo sine or cosine factor with a data word involves only one addition step at the most, because one of the addition steps must always be allotted to the required summation in the integration register. For example, for processing the digitized unbalance force quantity while shaft 23 is moving through angular increment 3, the digitized unbalance force signal in a random access memory register contained in the CPU is only required to be shifted left four times followed by the addition of the thus shifted digital quantity to the integration register. This provides a multiplication product quantity to the integration register containing a factor representative of a sine value of 0.25. In this fashion all of the required computational steps may be performed by the computer 61 while obtaining a relatively high speed of rotation in the rotating body so that a fine measurement of the unbalance forces generated by the spinning body may be made.

Where time available for computation is severely restricted, the system disclosed herein may be implemented with a set of extraction functions which each have only one bit of information of primary interest. One set of sine representative values selected for the one-bit extraction function is shown in Table IV.

TABLE IV

| Angular Increment | From | TO | Sine Value | Binary | Decimal |
|---|---|---|---|---|---|
| 0 | 0° | 5.62° | 0 | 0000 0000 | 0 |
| 1 | 5.62 | 11.19 | 0.0156 | 0000 0001 | 1 |
| 2 | 11.19 | 16.81 | 0.0312 | 0000 0010 | 2 |
| 3 | 16.81 | 22.43 | 0.0625 | 0000 0100 | 4 |
| 4 | 22.43 | 28.05 | 0.1250 | 0000 1000 | 8 |
| 5-6 | 28.05 | 39.30 | 0.2500 | 0001 0000 | 16 |

TABLE IV-continued

| Angular Increment | From | TO | Sine Value | Binary | Decimal |
|---|---|---|---|---|---|
| 7-10 | 39.30 | 61.80 | 0.5000 | 0010 0000 | 32 |
| 11-15 | 61.80 | 90.00 | 1.0000 | 0100 0000 | 64 |

The extraction function values of Table IV are also permanently stored in memory within computer 61 and may be retrieved to be used in processing the digitized force transducer signals at predetermined angular increments of shaft rotation in the same fashion as the values shown in Table I. It should be noted that each processing operation in this instance is accomplished by merely shifting the digitized force unbalance data to the left in its random access memory register a predetermined number of times prior to adding the result to the integration register; i.e., shift left once to process with decimal 2, shift left three times to process with decimal 8, etc.

The harmonic content contribution due to the one bit extraction function shown in Table IV is set forth in Table V. As in Table II, the unbalance force is a pure sine wave that is coincident with the "home" position.

TABLE V

| HARMONIC | SINE COEFFICIENT | COSINE COEFFICIENT |
|---|---|---|
| Fundamental | 0.88025 | Zero |
| Second | 0.00000 | " |
| Third | 0.19950 | " |
| Fourth | 0.00000 | " |
| Fifth | 0.02116 | " |
| Sixth | 0.00000 | " |
| Seventh | 0.01560 | " |
| Eighth | 0.00000 | " |
| Ninth | 0.06245 | " |

As seen in Table V the contribution of third harmonic by the one bit extraction function to the data is relatively high. However, in some circumstances this may be acceptable. The fundamental may easily be normalized. The one bit extraction function is presented to show that the extraction function may be tailored to the circumstances, so that any number of angular increments may be used in conjunction with any number of informational bits of primary interest in the extraction function according to the execution time available for processing and the amount of data to be processed. For example, the digital sine and cosine factors could have three bits of primary interest (bits set to one) if accuracy required and time permitted.

Returning once again to FIG. 15 after the integration routine has been completed, the inquiry is made as to whether the machine mode switch is selected to the run position. When the answer to this inquiry is yes, the integrals obtained in the integration routine are corrected for shaft unbalance by subtracting therefrom the stored shaft unbalance integrals, Erxo, etc., obtained when the system was undergoing the zero shaft unbalance mode. The integrals thus corrected for shaft unbalance are represented by Erx, Ery, Elx, and Ely as seen in FIG. 15. Thereafter, the stored shaft unbalance integrals and the stored calibration constants are added together with the stored gain setting for the gain control amplifiers and added to the check sum to verify the stored data in the nonvolatile RAM 68. If the RAM is verified, the x and y components of the right and left transducer signals resulting from a rotating body unbalance run are calculated as seen in relationships (9) and (10) recited hereinbefore. The routine proceeds to point G as seen in FIG. 15, which is also seen as entering the deceleration subroutine in FIG. 16.

Next, the inquiry is made as to whether the static unbalance measurement has been selected. If the answer is yes, the static unbalance calculations are made as seen in relationships (15) hereinbefore. If the answer is no, the plane separation calculations are undertaken in the computer 61 as in the relationships (11) and (12) hereinbefore, After either the static unbalance calculations or the plane separation calculations have been completed the rectangular coordinate data is transformed to polar coordinates by means of equations (13) listed hereinbefore. Thereafter a force to weight conversion is made in accordance with the relationships (14) given hereinbefore for both the left and right planes P1 and P2 respectively. In the event of a dynamic unbalance measurement, counterweights are generally added at both planes P1 and P2. Counterweight is characteristically added only at one plane, such as the right plane P2, in the event of static unbalance measurement, although it may be added on the same radius in both planes if difficulty is encountered in physically attaching the weight in one plane only. The binary weight signal is transformed to a binary coded decimal form which is used to excite the left and right weight displays 46 and 47 on the front panel of the console 41. Thereafter, the routine returns to Point A in FIG. 11. It should be noted that the left and right position indicators 48 on the front panel 42 are bar indicators wherein a light will be at the center of the indicator as the heavy spot on the rotating body assumes a position vertically downward from the center of the shaft 23 for each of the left and right rims. This puts the point on the rotating body for the application of a counterbalance weight vertically above the shaft 23 in a convenient place for application. In the event the static unbalance measurement is selected, both the left and the right position indicator lights move together and the weight is placed vertically above the shaft 23 in one or both planes when the lights are centered to thereby statically counterbalance the unbalance mass in the rotating body which is centered vertically below the shaft 23.

Figure 17:
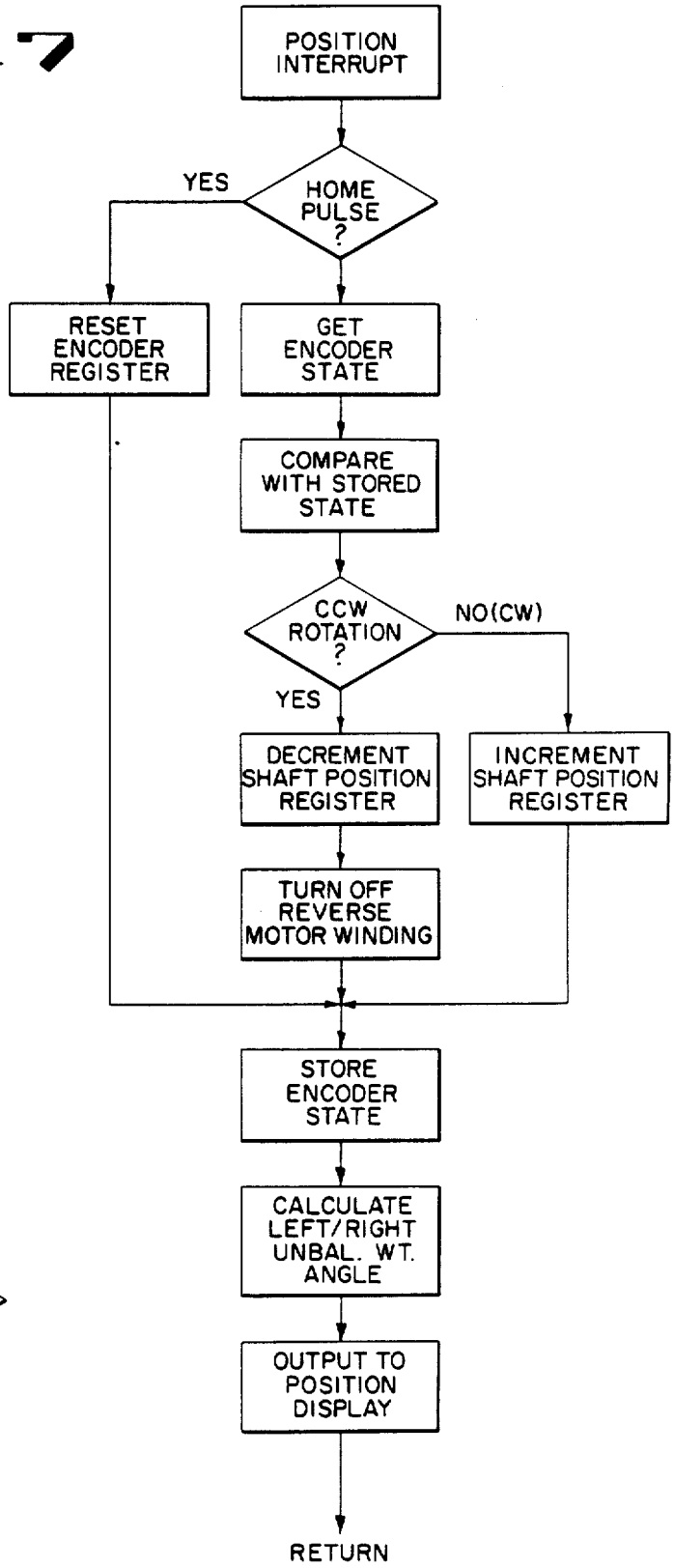
FIG. 17 is a program flow diagram for the position interrupt subroutine of the program of FIG. 10.

FIG. 17 shows the position interrupt routine which is undertaken during the deceleration routine from one half of the rotational speed downward to zero speed in this embodiment. The position interrupt routine is thereafter in effect until the shaft 23 is commanded to accelerate for a subsequent spin by the start/spin switch 45. This routine is triggered by the position interrupt pulses from the "times four" circuit 62 (FIG. 4) and thus is initiated 256 times for each revolution of the shaft 23. From FIG. 5 it will be seen that the computer 61 is also provided with inverted $\phi 1$ pulses and non-inverted $\phi 2$ pulses, such pulse trains being shown in FIG. 9. These are fed to an encoder stage register in the computer. As the rotating body decreases through one half of the unbalance measurement speed and the position interrupt routines are initiated, an inquiry is first made as to whether a "home" pulse is sensed. If the answer is no, the last encoder state is retrieved from an encoder state register and compared with the current encoder state. The sequence sensed by the comparison provides clockwise or counterclockwise rotational data, and, as seen from FIG. 9, the encoder state (i.e., $\phi 2$ and $\phi 1$ pulses) will change on each new position interrupt pulse. An inquiry is then made as to whether the rotation is counterclockwise. If the answer is no, the rotation is clockwise which means that the wheel is still rotating in its "spin" direction. Thereafter, a shaft position register which has a range of zero to 255 counts is incremented. The left and right unbalance weight angles relative to the "home" position have been calculated by the computer 61 as represented by equations (13) seen hereinbefore and have been stored in left and right calculated angle registers. The difference between the quantity stored in the shaft position register and each of the left and right calculated angle registers is dependent on the mounted rotating body position and is therefore readily calculated and indicated on the left and right position display 48 on the front panel 42.

In the event the answer to the counterclockwise rotation inquiry is yes, the shaft position register is decremented and the motor control 78 in FIG. 4 is commanded to turn off the power which reverses the motor 36. This is necessary because the counterclockwise direction is the reverse direction and powering the motor 36 in the counterclockwise direction would clearly cause it to continue to rotate in the reverse direction. When a "home" pulse is detected during a scan through the position interrupt subroutine, the shaft position register is reset to zero count. The existing encoder state is stored for subsequent retrieval and comparison as stated hereinbefore in order to determine the direction of rotation of the shaft. The differences between the indicated angle value stored in the shaft position register and the values in the left and right calculated angle registers is displayed at the left and right position display 48 as previously described. The position interrupt subroutine continues to monitor any rotation of the shaft each time a position interrupt pulse is received until a subsequent spin command is given to the system whereby the position interrupt routine will not be entered until the deceleration period as aforedescribed.

Figure 18:
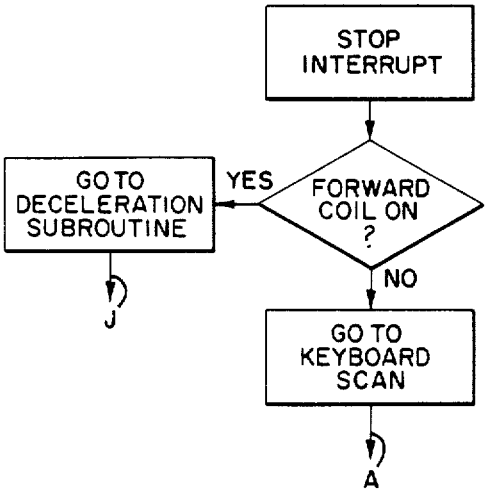
FIG. 18 is a program flow diagram for the stop interrupt subroutine of the program FIG. 10.

FIG. 18 shows the stop interrupt subroutine which is triggered either manually by the stop switch 73 or automatically by the guard interlock 72 (FIG. 7). When a stop interrupt signal is provided to the computer peripheral input/output section Z20, as shown in FIG. 8, an inquiry is made as to whether the forward motor coil is energized. If the answer is no, the routine proceeds to the scan routine at point A in FIG. 11 because the motor 36 is not running. This portion of the routine is implemented so that the motor 36 is not pulsed backward when the stop interrupt occurs with the motor stopped. If the answer to the inquiry is yes, then the program goes to the deceleration subroutine at point J seen in FIG. 16. The motor is brought to a stop by reverse rotation power application at the motor control 78 and the routine proceeds to point A in FIG. 11.

Although the best mode contemplated for carrying out the present invention has been herein shown and described, it will be apparent that modification and variation may be made without departing from what is regarded to be the subject matter of the invention.

What is claimed is:

1. A method of measuring unbalance in a rotating body mounted on a rotating shaft coupled to a force transducer providing an unbalance signal indicative of the instantaneous unbalance magnitude component relative to a known angular reference, comprising the steps of digitizing the unbalance signal, sampling the digitized unbalance signal at each of a predetermined number of angular increments of shaft rotation, storing a plurality of digital sine and cosine representative quantites corresponding to predetermined ones of the angular increments, combining the sampled digitized unbalance signal with the corresponding sine quantity and with the corresponding cosine quantity, the step of combining being limited to include no more than one addition step so that the combinations are obtained during the time the shaft transits each angular increment, whereby separate combined digital quantities are obtained containing sine factors and cosine factors, summing the quantities containing the sine factors over a predetermined number of angular increments, summing the quantities containing the cosine factors over the predetermined number of angular increments, whereby data is obtained indicative of unbalance magnitude and angular position relative to the known angular reference.

2. A method as in claim 1 wherein the step of storing comprises the steps of storing a series of digital numbers each having only two information bits of primary interest.

3. A method as in claim 1 wherein the step of storing comprises the steps of storing a series of digital numbers having only one information bit of primary interest, and wherein the step of combining comprises only shifting the digitized unbalance signal in accordance with the number of digital places in the stored digital number, whereby the execution time for obtaining the combined digital quantities is reduced compared to the execution time for conventional digital multiplication.

4. A method as in claim 1 together with the steps of storing the data, introducing parameters descriptive of the rotating body, and defining the unbalance magnitude and angular position corresponding to the introduced parameters.

5. A method as in claim 1 together with the steps of mounting a known weight at a known position on the shaft, rotating the shaft, thereby obtaining calibration sums containing known force transducer error, removing the known weight and rotating the shaft unloaded, thereby obtaining unloaded shaft unbalance sums, combining the calibration sums and the shaft unbalance sums so that calibration constants are obtained, and applying the calibration constants to the combined digital quantities containing sine factors and cosine factors thereby providing data corrected for transducer errors and shaft unbalance.

6. A method as in claim 5 together with the step of storing the calibration constants in nonvolatile memory, whereby they are retained during power-off conditions and further calibration is necessary only after mechanical changes occur which are related to the force transducers or the rotating shaft.

7. In combination with apparatus for measuring unbalance in a rotatable body wherein at least one force transducer is disposed to provide an electrical signal indicative of periodic unbalance forces coupled thereto through a shaft adapted to support the rotatable body for rotation thereon, and wherein an analog-to-digital converter is coupled to receive the electrical signal and to provide a digital word output corresponding thereto, the improvement comprising means for controlling said analog-to-digital converter to provide said digital words at a predetermined number of angular increments during each revolution of the shaft, a memory containing a plurality of stored digital sine and cosine representative values, ones of said digital sine and cosine representative values corresponding to predetermined ones of said predetermined number of angular increments, means for modifying each of said digital words in accordance with the corresponding stored digital sine and cosine representative values and for limiting each modification to include only one addition function so that digital sine and digital cosine representative quantities are provided during the time the shaft is traversing each of said angular increments, and means for summing the digital sine quantities and the digital cosine quantities for each of said angular increments, whereby digital data is provided for determining unbalance force magnitude and direction in the rotatable body.

8. The combination of claim 7 including a processor operating to convert the data to signals indicative of unbalance weights which when counterbalanced provide a substantially balanced rotatable body.

9. A method of calibrating apparatus for measuring unbalance in a body mounted on a spin shaft having an angular reference position relative to a supporting framework therefor and being coupled to a force transducer which provides an unbalance signal having an instantaneous magnitude indicative of a component of the unbalance force which results when the shaft is spun, comprising the steps of applying a known unbalance weight to the spin shaft at a known angular position relative to the angular reference position, spinning the shaft with the known unbalance weight applied thereto, digitizing the unbalance signal indicative of the known unbalance weight, storing a plurality of digital sine and cosine representative quantities corresponding to predetermined angular increments of spin shaft rotation, modifying the digitized unbalance signal in accordance with the corresponding digital sine representative quantity at a plurality of the angular shaft increments while the shaft is being spun, modifying the digitized unbalance signal in accordance with the corresponding digital cosine representative quantity at a plurality of the angular shaft increments while the shaft is being spun, summing the modified signals containing unbalance signal and sine representative factors, summing the modified signals containing unbalance signal and cosine representative factors, whereby uncorrected calibration sums are obtained, spinning the shaft with no load applied, digitizing the unbalance signal indicative of no load shaft unbalance, modifying the digitized no load unbalance signal in accordance with the corresponding digital sine representative quantity at a plurality of the angular shaft increments while the shaft is being spun to obtain combined no load signals containing sine representative factors, modifying the digitized no load unbalance signal in accordance with the corresponding digital cosine representative quantity at a plurality of the angular shaft increments while the shaft is being spun to obtain combined no load signals containing cosine representative factors, summing the combined no load signals containing sine representative factors, summing the combined no load signals containing cosine representative factors, whereby shaft unbalance sums containing sine and cosine representative factors are obtained, applying the shaft unbalance sums containing sine and cosine representative factors to the uncorrected calibration sums containing sine and cosine representative factors respectively, thereby obtaining calibration sums corrected for shaft unbalance and for transducer error in the apparatus.

10. A method for digitally acquiring calibration constants used in calculation of unbalance data obtained from a wheel balancing apparatus haivng a spin shaft with a removable known unbalance weight mounted thereon, the spin shaft being mounted on a framework which provides a spin shaft angular reference, and a force transducer mounted in the framework coupled to the spin shaft providing an unbalance signal indicative of a component of the unbalance force relative to the angular reference when the spin shaft is rotated, said method comprising the steps of digitizing the unbalance signal, storing a plurality of digital sine and cosine representative quantities corresponding to predetermined angular increments of spin shaft rotation, processing the digitized unbalance signal in accordance with corresponding ones of the digital sine representative quantities at each angular increment, processing the digitized unbalance signal in accordance with corresponding ones of the digital cosine representative quantities at each angular increment, summing the processed digitized signals containing sine representative factors, summing the processed digitized signals containing cosine representative factors, whereby calibration sums containing force transducer errors are obtained, repeating the foregoing digitizing, processing and summing steps with the known unbalance weight removed from the spin shaft, whereby calibration sums containing shaft unbalance errors are obtained, and digitally correcting the calibration sums containing shaft unbalance errors, whereby digital calibration sums are provided from which apparatus calibration constants are calculated, whereby unbalance data is provided which is substantially free of force transducer and shaft unbalance errors.

11. The method of claim 10 wherein the steps of processing include addition operations, together with the step of limiting such operations to one during each processing step.

12. Apparatus providing calibrated digital measurement of unbalance in a rotating body, comprising a framework, a spin shaft having an angular reference position relative to said framework, means for mounting said spin shaft for rotation in said framework and for rotating said spin shaft, means mounted in said framework and coupled to said spin shaft for providing an unbalance signal indicative of a component of unbalance force resulting from rotation of said spin shaft, means for detecting angular location of said spin shaft relative to said reference position at a plurality of angular increments during each rotation of said shaft, an analog-to-digital converter for digitizing said unbalance signal, a memory operating to store a plurality of digital sine representative quantities and a plurality of digital cosine representative quantities corresponding to predetermined ones of said angular increments, a known calibration weight configured for attachment to said spin shaft at a predetermined angular position thereon relative to said reference, means for combining said digitized unbalance signal at each of said angular increments with corresponding ones of said digital sine representative quantities providing digital sine quantities and with corresponding ones of said digital cosine representative quantities providing digital cosine quantities, means for summing said digital sine quantities and for summing said digital cosine quantities so that when said shaft is spun with said calibration weight attached and with said shaft free of any extraneous weight uncorrected calibration sums and unloaded shaft sums are obtained, and means for modifying said uncorrected calibration sums with said unloaded shaft sums to obtain calibration data corrected for shaft unbalance and for calculating and storing digital calibration constants in accordance with said calibration data, whereby error data of both mechanical and electrical origin are detected and stored to provide for removal of such errors from subsequent unbalance data.

13. Apparatus as in claim 12 wherein said means for combining includes means for providing a single digital addition operation to obtain each digital sine and digital cosine product.

14. A method of calibrating an apparatus for measuring mass unbalance in a rotating body wherein the body is mounted in a known position on a rotating shaft supported in a frame and the shaft is coupled to a sensor which provides an electrical signal indicative of the mass unbalance, comprising the steps of spinning the shaft while it is unloaded and monitoring the substantially periodic electrical signal, recovering the fundamental sine and cosine coefficients from the unloaded periodic electrical signal, storing the fundamental coefficients from the unloaded signal as shaft unbalance values, spinning the shaft while it is loaded with a known unbalance mass and monitoring the substantially periodic electrical signal, recovering the fundamental sine and cosine coefficients from the known loaded periodic electrical signal, and storing the fundamental coefficients from the known loaded signal as calibration values, so that when electrical signals are obtained when the body having unknown unbalance is rotated on the shaft and such signals are processed by applying the shaft unbalance and calibration values, corrected mass unbalance location in the body is obtained.

15. A method as in claim 14 together with the step of preserving the stored shaft unbalance and calibration values when the apparatus is shut down.

16. A method as in claim 14 together with the step of spinning the shaft with the body having unknown mass unbalance mounted thereon, obtaining a substantially periodic unknown unbalance electrical signal, and selecting between a low range and a high range for processing the unknown unbalance signals corresponding to relatively small and relatively high unbalance forces respectively.

17. A method as in claim 14 wherein the body having unknown unbalance is located in a plane displaced from the plane in which the sensor is located together with the step of translating the unbalance detected by the sensor to the plane of the body.

18. A method as in claim 17 wherein the step of translating comprises the steps of separating the plane of the body into two planes intersecting the shaft axis at predetermined locations and translating the detected unbalance to the two planes so that compensation for the unbalance applied in the two planes will substantially eliminate any couple introduced by the body about the diameter of the rotating shaft.

19. Apparatus for measuring mass unbalance in a rotating body wherein the body is mounted in a known position on a rotating shaft supported in a frame wherein the shaft is coupled to a sensor which provides an electrical signal indicative of the unbalance of the rotating mass, the improvement comprising means for receiving the electrical signal when the shaft is rotated unloaded and for providing a fundamental sine and cosine coefficient from the unloaded electrical signal, a memory for storing the fundamental coefficients from the unloaded signal, said means for receiving being arranged to also receive the electrical signal when the shaft is rotated with a known mass unbalance for providing a fundamental sine and cosine coefficient from the known loaded signal, said memory being arranged to also store the fundamental coefficients from the known loaded signal, and means for processing the electrical signal provided when a body having an unknown mass unbalance is rotated on the shaft, said last named means being connected with said memory to use the stored fundamental coefficients from the unloaded and known loaded signals whereby data indicative of the unbalance mass location in the body is provided which is corrected for both sensor errors and shaft unbalance errors.

20. Apparatus as in claim 19 wherein said memory is non-volatile, whereby stored quantities are preserved when the apparatus is shut down.

21. Apparatus as in claim 19 together with means sensitive to the magnitude of the electrical signal for selecting between a low range and a high range so that said means for processing the electrical signal accommodates signals indicative of relatively small and relatively high unbalance forces respectively.

22. Apparatus as in claim 19 wherein the body is mounted in a plane remote from a plane in which the sensor is mounted, together with means for translating the data indicative of unbalance mass location to the plane of the body.

23. A method of measuring unbalance in a rotating body mounted on a rotating shaft coupled to force transducers which provide unbalance signals indicative of the instantaneous unbalance magnitude component relative to a known angular reference, comprising the steps of spinning the shaft with no load mounted thereon, whereby the force transducers provide a no load unbalance signal, computing no load unbalance signal numerical quantities representative of the phase and magnitude of the unbalance relative to the known angular reference, spinning the shaft with a known calibration weight at a known position mounted thereon, whereby the force transducers provide a calibration unbalance signal, computing calibration unbalance signal numerical quantities representative of the phase and magnitude of the unbalance relative to the known angular reference, subtracting the no load unbalance signal numerical quantities from the calibration unbalance signal numerical quantities to provide corrected calibration numerical quantities, computing calibration constants from the corrected calibration numerical quantities thereby relating force transducer output magnitude and phase to known unbalance forces, spinning the shaft with an unknown unbalance weight mounted thereon, whereby the force transducers provide an unbalance signal, computing the unbalance signal numerical quantities representative of the phase and magnitude of the unbalance relative to the known angular reference, subtracting the no load numerical quantities from the unbalance numerical quantities to provide modified unbalance numerical quantities, and applying the calibration constants to the modified unbalance numerical quantities thereby obtaining corrected unbalance data.

24. The method of claim 24 together with the steps of storing the no load numerical quantities and the calibration constants, whereby the steps of spinning the shaft with no load and with a known calibration weigth mounted thereon may be performed once for a plurality of spins with unknown unbalance weights mounted thereon.

25. The method of claim 24 together with the step of translating the corrected unbalance data to the plane in which the unbalance weight center of mass is located.

26. The method of claim 24 wherein the unknown unbalance weight comprises the unbalanced weight in a wheel having a rim with a tire mounted thereon, together with the step of translating the corrected unbalance data to the two planes of the wheel rim, whereby dynamic unbalance in the wheel is measured.

*27. A method of calibrating apparatus for measuring unbalance in a body mounted on a spin shaft having an angular reference position relative to a supporting framework therefor and being coupled to a force transducer which provides an unbalance signal having an instantaneous magnitude indicative of a component of the unbalance force which results when the shaft is spun, comprising the steps of spinning the shaft with no load applied, digitizing the unbalance signal indicative of no load shaft unbalance, storing a plurality of digital sine and cosine representative quantities corresponding to predetermined angular increments of spin shaft rotation, modifying the digitized no load unbalance signal in accordance with the corresponding digital sine representative quantity at a plurality of the angular shaft increments while the shaft is being spun to obtain combined no load signals containing sine representative factors, modifying the digitized no load unbalance signal in accordance with the corresponding digital cosine representative quantity at a plurality of the angular shaft increments while the shaft is being spun to obtain combined no load signals containing cosine representative factors, summing the combined no load signals containing sine representative factors, summing the combined no load signals containing cosine representative factors, whereby shaft unbalance sums containing sine and cosine representative factors are obtained, and applying the shaft unbalance sums containing sine and cosine representative factors to the measured unbalance signals for the unbalanced body, thereby obtaining measured unbalance quantities corrected for shaft unbalance.*

*28. A method for digitally acquiring calibration constants used in calculation of unbalance data obtained from a wheel balancing apparatus having a spin shaft, the spin shaft being mounted on a framework which provides a spin shaft angular reference, and a force transducer mounted in the framework coupled to the spin shaft providing an unbalance signal indicative of a component of the unbalance force relative to the angular reference when the spin shaft is rotated, said method comprising spinning the spin shaft with no load mounted thereon to provide an unloaded shaft unbalance signal from the force transducer, digitizing the unbalance signal, storing a plurality of digital sine and cosine representative quantities corresponding to predetermined angular increments of spin shaft rotation, processing the digitized unbalance signal in accordance with corresponding ones of the digital sine representative quantities at each angular increment, processing the digitized unbalance signal in accordance with corresponding ones of the digital cosine representative quantities at each angular increment, summing the processed digitized signals containing sine representative factors, summing the processed digitized signals containing cosine representative factors, whereby calibration sums containing shaft unbalance errors are obtained, and calculating apparatus calibration constants using the calibration sums, whereby when the calibration constants are applied to unbalance data for wheels having unknown unbalance, corrected unbalance data therefor is provided which is substantially free of shaft unbalance errors.*

*29. Apparatus providing calibrated digital measurement of unbalance in a rotating body, comprising a framework, a spin shaft having an angular reference position relative to said framework, means for mounting said spin shaft for rotation in said framework and for rotating said spin shaft, means mounted in said framework and coupled to said spin shaft for providing an unbalance signal indicative of a component of unbalance force resulting from rotation of said spin shaft, means for detecting angular location of said spin shaft relative to said reference position at a plurality of angular increments during each rotation of said shaft, an analog-to-digital converter for digitizing said unbalance signal, a first memory connected to said analog-to-digital converter operating to receive and store unbalance data when said shaft is spun free of any extraenous weight thereon, a second memory operating to store a plurality of digital sine representative quantities and a plurality of digital cosine representative quantities corresponding to predetermined ones of said angular increments, means for combining said digitized unbalance signal at each of said angular increments with corresponding ones of said digital sine representative quantities providing digital sine quantities and with corresponding ones of said digital cosine representative quantities providing digital cosine quantities, means for summing said digital sine quantities and for summing said digital cosine quantities so that when said shaft is spun with said shaft free of any extraneous weight unloaded shaft sums are obtained, and means for calculating and storing digital calibration constants in accordance with said unloaded shaft sums, whereby error data of mechanical origin are detected and stored and made available when data relative to unknown unbalance is collected to provide for removal of such errors from subsequent unbalance data.*

*30. A method of calibrating an apparatus for measuring mass unbalance in a rotating body wherein the body is mounted in a known position on a rotating shaft supported in a frame and the shaft is coupled to a sensor which provides an electrical signal indicative of the mass unbalance, comprising the steps of*

*spinning the shaft while it is unloaded and monitoring the substantially periodic electrical signal,*

*recovering the fundamental sine and cosine coefficients from the unloaded periodic electrical signal, and*

*storing the fundamental coefficients from the unloaded signal as shaft unbalance values,*

*so that when electrical signals are obtained when the body having unknown unbalance is rotated on the shaft and such signals are processed by applying the shaft unbalance values, corrected mass unbalance location in the body is obtained.*

*31. A method as in claim 30 together with the step of spinning the shaft with the body having unknown mass unbalance mounted thereon, obtaining a substantially periodic unknown unbalance electrical signal, and select-*

*ing between a low range and a high range for processing the unknown unbalance signals corresponding to relatively small and relatively high unbalance forces respectively.*

*32. Apparatus for measuring mass unbalance in a rotating body wherein the body is mounted in a known position on a rotating shaft supported in a frame wherein the shaft is coupled to a sensor which provides an electrical signal indicative of the unbalance of the rotating mass, the improvement comprising*

*means for receiving the electrical signal when the shaft is rotated unloaded and for providing a fundamental sine and cosine coefficient from the unloaded electrical signal,*

*a memory for storing the fundamental coefficients from the unloaded signal, and*

*means for processing the electrical signal provided when a body having an unknown mass unbalance is rotated on the shaft, said last named means being connected with said memory to use the stored fundamental coefficients from the unloaded signal, whereby data indicative of the unbalance mass location in the body is provided which is corrected for shaft unbalance errors.*

*33. Apparatus as in claim 32 together with means sensitive to the magnitude of the electrical signal for selecting between a low range and a high range so that said means for processing the electrical signal accommodates signals indicative of relatively small and relatively high unbalance forces respectively.*

*34. A method of measuring unbalance in a rotating body mounted on a rotating shaft coupled to force transducers which provide unbalance signals indicative of the instantaneous unbalance magnitude component relative to a known angular reference, comprising the steps of*

*spinning the shaft with no load mounted thereon, whereby the force transducers provide a no load unbalance signal,*

*spinning the shaft with an unknown unbalance weight mounted thereon, whereby the force transducers provide an unbalance signal,*

*subtracting the no load unbalance signal from the unbalance signal to provide modified unbalance signals, and*

*computing corrected unbalance data representative of the phase and magnitude of the unbalance relative to the known angular reference utilizing the modified unbalance signals.*

*35. The method of claim 34 together with the steps of storing the no load unbalance signals, whereby the step of spinning the shaft with no load mounted thereon may be performed once for a plurality of spins with unknown unbalance weights mounted thereon.*

*36. The method of claim 34 wherein the unknown unbalance weight comprises the unbalanced weight in a wheel having a rim with a tire mounted thereon, together with the step of translating the corrected unbalance data to the two planes of the wheel rim, whereby dynamic unbalance in the wheel is measured.*

*37. A method of calibrating apparatus for measuring unbalance in a body mounted on a spin shaft with a shaft encoder mounted in a supporting framework, wherein an angular reference is provided for the shaft which is coupled to a force transducer which provides an unbalance signal having an instantaneous magnitude indicative of a component of the unbalance force which results when the shaft is spun, comprising the steps of applying a known unbalance weight to the spin shaft at a known angular position relative to the angular reference, spinning the shaft with the known unbalance weight applied thereto, digitizing the unbalance signal indicative of the known unbalance weight, filtering the digitized unbalance signal, extracting the in phase and the quadrature components of the filtered unbalance signal relative to the shaft reference, whereby uncorrected calibration quantities are obtained, spinning the shaft with no load applied, digitizing the unbalance signal indicative of no load shaft unbalance, filtering the digitized unbalance signal, extracting the in phase and the quadrature components of the filtered unbalance signal relative to the shaft reference, whereby shaft unbalance quantities are obtained, applying the shaft unbalance quantities to the uncorrected calibration quantities thereby obtaining calibration quantities corrected for shaft unbalance.*

*38. A method of calibrating apparatus for measuring unbalance in a body mounted on a spin shaft with a shaft encoder mounted in a supporting framework, wherein an angular reference is provided for the shaft which is coupled to a force transducer which provides an unbalance signal having an instantaneous magnitude indicative of a component of the unbalance force which results when the shaft is spun, comprising the steps of applying a known unbalance weight to the spin shaft at a known angular position relative to the angular reference, spinning the shaft with the known unbalance weight applied thereto, obtaining the magnitude and the phase angle of the unbalance signal relative to the angular reference as indicated by the force transducer, whereby uncorrected calibration quantities are obtained, spinning the shaft with no load applied, obtaining the magnitude and the phase angle of the no load unbalance signal relative to the angular reference as indicated by the force transducer, whereby shaft unbalance quantities are obtained, applying the shaft unbalance quantities to the uncorrected calibration quantities, thereby obtaining calibration quantities corrected for shaft unbalance.*

*39. Apparatus for measuring mass unbalance in a rotating body wherein the body is mounted in a known position on a rotating shaft supported in a frame, wherein the shaft is coupled to a sensor which provides an electrical signal indicative of the unbalance of the rotating mass, and wherein an angular reference position is provided for the shaft, the improvement comprising*

*means for receiving the electrical signal when the shaft is rotated unloaded,*

*means for obtaining the magnitude and the phase angle of the unbalance electrical signal relative to the angular reference,*

*a memory for storing the magnitude and phase angle of the electrical signal when the shaft is unloaded,*

*said means for receiving being arranged to also receive the electrical signal when the shaft is rotated with a known mass unbalance, said means for obtaining magnitude and phase angle further operating to provide a corresponding signal, and said memory being arranged to also store magnitude and phase angle of the electrical signal when the known mass is on the shaft and the shaft is rotated, and*

*means for processing the electrical signals provided when a body having an unknown mass unbalance is rotated on the shaft, said last named means being coupled to said memory to use the stored magnitudes and phase angles from the unloaded and known loaded signals, whereby data indicative of the unbalance mass location in the body is provided which is corrected for both sensor errors and shaft unbalance errors.*

*40. A method of calibrating apparatus for measuring unbalance in a body mounted on a spin shaft with a shaft encoder mounted in a supporting framework, wherein an angular reference is provided for the shaft which is coupled*

*to a force transducer which provides an unbalance signal having an instantaneous magnitude indicative of a component of the unbalance force which results when the shaft is spun, comprising the steps of spinning the shaft with no load applied, digitizing the unbalance signal indicative of no load shaft unbalance, filtering the digitized unbalance signal, extracting the in phase and quadrature components of the filtered unbalance signal relative to the shaft reference, whereby shaft unbalance quantities are obtained, and applying the shaft unbalance quantities to the measured unbalance signals for the unbalanced body, thereby obtaining measured unbalance quantities corrected for shaft unbalance.*

*41. A method of calibrating apparatus for measuring unbalance in a body mounted on a spin shaft with a shaft encoder mounted in a supporting framework, wherein an angular reference is provided for the shaft which is coupled to a force transducer which provides an unbalance signal having an instantaneous magnitude indicative of a component of the unbalance force which results when the shaft is spun, comprising the steps of spinning the shaft with no load applied, obtaining the magnitude and the phase angle of the no load unbalance signal relative to the angular reference as indicated by the force transducer, whereby shaft unbalance quantities are obtained, applying the shaft unbalance quantities to the measured unbalance signals for the unbalanced body, thereby obtaining measured unbalance quantities corrected for shaft unbalance.*

*42. Apparatus for measuring mass unbalance in a rotating body wherein the body is mounted in a known position on a rotating shaft supported in a frame wherein the shaft is coupled to a sensor which provides an electrical signal indicative of the unbalance of the rotating mass, the improvement comprising*

*means for receiving the electrical signal when the shaft is rotated unloaded and for providing an output indicative of the magnitude and angular location of the unloaded shaft unbalance,*

*a memory for storing the output indicative of the unloaded shaft unbalance, and*

*means for processing the electrical signal provided when a body having an unknown mass unbalance is rotated on the shaft, said last named means being coupled to said memory to use the stored output indicative of unloaded shaft unbalance, whereby data indicative of the unbalance mass location in the rotating body is provided which is corrected for shaft unbalance errors.*

*43. A method of calibrating an apparatus for measuring mass unbalance in a rotating body wherein the body is mounted in a known axial position on a rotatable shaft supported in a frame and the shaft is coupled to sensor means which provides an output signal indicative of the mass unbalance, comprising the steps of*

*spinning the shaft while it is unloaded and monitoring the resulting substantially periodic output signal,*

*recovering the fundamental sine and cosine coefficients from the unloaded periodic output signal,*

*storing the fundamental coefficients from the unloaded output signal as shaft unbalance values, and*

*applying the shaft unbalance values to processed output signals obtained when the body having unknown unbalance is rotated on the shaft, whereby corrected mass unbalance location in the body is obtained.*

*44. Apparatus for measuring mass unbalance in a rotatable body wherein the body is mounted in a known axial position on a rotatable shaft supported in a frame wherein the shaft is coupled to sensor means for providing a periodic output signal indicative of the mass unbalance of the mounted body as it is rotated, the improvement comprising*

*means for receiving the output signal when the shaft is rotated unloaded and for extracting fundamental sine and cosine output signal values from the output signal,*

*means for storing the fundamental sine and cosine values from the output signal when the shaft is rotated unloaded,*

*said means for receiving further operating to receive the output signal when a body having an unknown mass unbalance is rotated on the shaft, and*

*means coupled to said means for storing for processing said last mentioned output signal with the stored fundamental sine and cosine output signal values, whereby data indicative of the mass unbalance in the body is provided which is corrected for shaft unbalance.*

*45. A method of measuring unbalance in an automobile wheel mounted on a rotating shaft coupled to force transducers which provide unbalance output signals indicative of the instantaneous unbalance magnitude component relative to a known angular reference, comprising the steps of*

*spinning the shaft with no load mounted thereon, whereby the force transducers provide periodic no load signals,*

*spinning the shaft with an automobile wheel mounted thereon, whereby the force transducers provide periodic unbalance signals,*

*applying the no load signals to the last mentioned unbalance signals to provide modified unbalance signals, and*

*computing corrected unbalance signal quantities representative of the phase and magnitude of the automobile wheel unbalance relative to the known angular reference, utilizing the modified unbalance signals.*

* * * * *